US007455798B2

(12) United States Patent  (10) Patent No.: US 7,455,798 B2
Datta et al.  (45) Date of Patent: Nov. 25, 2008

(54) METHODS FOR PRODUCING LOW DENSITY PRODUCTS

(75) Inventors: Amlan Datta, Rancho Cucamonga, CA (US); Hamid Hojaji, Claremont, CA (US); Shannon Marie Labernik, Rancho Cucamonga, CA (US); David Leslie Melmeth, Upland, CA (US); Thinh Pham, Kensington (AU); Huagang Zhang, Yucaipa, CA (US)

(73) Assignee: James Hardie International Finance B.V., Amsterdam (NL)

( * ) Notice: Subject to any disclaimer, the term of this patent is extended or adjusted under 35 U.S.C. 154(b) by 389 days.

(21) Appl. No.: 10/787,894

(22) Filed: Feb. 25, 2004

(65) Prior Publication Data

US 2004/0262801 A1  Dec. 30, 2004

Related U.S. Application Data

(63) Continuation-in-part of application No. 10/648,184, filed on Aug. 25, 2003.

(60) Provisional application No. 60/405,790, filed on Aug. 23, 2002, now abandoned, provisional application No. 60/471,400, filed on May 16, 2003, now abandoned.

(51) Int. Cl.
  *C04B 35/64* (2006.01)
  *C03B 19/08* (2006.01)
(52) U.S. Cl. .............................. 264/43; 264/54; 264/628
(58) Field of Classification Search ................... 264/43, 264/628; 65/21.4
  See application file for complete search history.

(56) References Cited

U.S. PATENT DOCUMENTS

| 2,676,892 A | 4/1954 | McLaughlin |
| 2,797,201 A | 6/1957 | Veatch |
| 2,978,340 A | 4/1961 | Veatch et al. |
| 3,256,105 A | 6/1966 | Alford |
| 3,321,414 A | 5/1967 | Vieli |
| 3,365,315 A | 1/1968 | Beck et al. |

(Continued)

FOREIGN PATENT DOCUMENTS

CA  1040859  10/1978

(Continued)

OTHER PUBLICATIONS

Office Action dated Aug. 16, 2004 to U.S. Appl. No. 10/648,009.

(Continued)

*Primary Examiner*—Edmund H. Lee
(74) *Attorney, Agent, or Firm*—Gardere Wynne Sewell LLP

(57) ABSTRACT

A method of preparing a low-density material and precursor for forming a low-density material is provided. An aqueous mixture of inorganic primary component and a blowing agent is formed, the mixture is dried and optionally ground to form an expandable precursor. Such a precursor is then fired with activation of the blowing agent being controlled such that it is activated within a predetermined optimal temperature range. Control of the blowing agent can be accomplished via a variety of means including appropriate distribution throughout the precursor, addition of a control agent into the precursor, or modification of the firing conditions such as oxygen deficient or fuel rich environment, plasma heating etc.

77 Claims, 11 Drawing Sheets

(product of Formulation 1A).

U.S. PATENT DOCUMENTS

| | | |
|---|---|---|
| 3,752,685 A | 8/1973 | Honda et al. |
| 3,782,985 A | 1/1974 | Gebhardt |
| 3,838,998 A | 10/1974 | Matthews et al. |
| 3,873,475 A | 3/1975 | Pechacek et al. |
| 3,888,957 A | 6/1975 | Netting et al. |
| 3,904,377 A | 9/1975 | Honda et al. |
| 3,909,283 A | 9/1975 | Warnke |
| 4,059,423 A | 11/1977 | De Vos |
| 4,111,713 A | 9/1978 | Beck |
| 4,133,854 A | 1/1979 | Hendricks |
| 4,234,344 A | 11/1980 | Tinsley et al. |
| 4,235,753 A | 11/1980 | Brown et al. |
| 4,235,836 A | 11/1980 | Wassell et al. |
| 4,252,193 A | 2/1981 | Powers et al. |
| 4,292,206 A | 9/1981 | Barnes, Jr. et al. |
| 4,303,732 A | 12/1981 | Torobin |
| 4,305,758 A | 12/1981 | Powers et al. |
| 4,307,142 A | 12/1981 | Blitstein et al. |
| 4,332,618 A | 6/1982 | Ballard |
| 4,336,338 A | 6/1982 | Downs et al. |
| 4,340,407 A | 7/1982 | Anderson et al. |
| 4,362,566 A | 12/1982 | Hinterwaldner |
| 4,370,166 A | 1/1983 | Powers et al. |
| 4,394,346 A | 7/1983 | Morooka |
| 4,411,847 A | 10/1983 | Netting et al. |
| 4,430,108 A | 2/1984 | Hojaji |
| 4,448,599 A | 5/1984 | Mackenzie et al. |
| 4,475,936 A | 10/1984 | Aston et al. |
| 4,501,830 A | 2/1985 | Miller et al. |
| 4,504,320 A | 3/1985 | Rizer et al. |
| 4,540,629 A | 9/1985 | Sands et al. |
| 4,602,962 A | 7/1986 | Fehlmann |
| 4,623,390 A | 11/1986 | Delmonico |
| 4,624,798 A | 11/1986 | Gindrup et al. |
| 4,637,990 A | 1/1987 | Torobin |
| 4,657,810 A | 4/1987 | Douden |
| 4,661,137 A | 4/1987 | Garnier et al. |
| 4,687,752 A | 8/1987 | Peters |
| 4,767,726 A | 8/1988 | Marshall |
| 4,769,189 A | 9/1988 | Douden |
| 4,826,788 A | 5/1989 | Dennert et al. |
| 4,837,069 A | 6/1989 | Bescup et al. |
| 4,867,931 A | 9/1989 | Cochran, Jr. |
| 4,871,495 A | 10/1989 | Helferich et al. |
| 4,937,210 A | 6/1990 | Jones et al. |
| 4,983,550 A | 1/1991 | Goetz et al. |
| 5,069,702 A | 12/1991 | Block et al. |
| 5,128,114 A | 7/1992 | Schwartz |
| 5,164,003 A | 11/1992 | Bosco et al. |
| 5,176,732 A | 1/1993 | Block et al. |
| 5,194,334 A | 3/1993 | Uerdingen et al. |
| 5,384,345 A | 1/1995 | Naton |
| 5,407,983 A | 4/1995 | Naton |
| 5,443,603 A | 8/1995 | Kirkendall |
| 5,458,973 A | 10/1995 | Jeffs |
| 5,534,348 A | 7/1996 | Miller et al. |
| 5,591,684 A | 1/1997 | Kawachi et al. |
| 5,849,055 A | 12/1998 | Arai |
| 5,858,083 A | 1/1999 | Stav et al. |
| 5,895,768 A | 4/1999 | Speit |
| 5,899,256 A | 5/1999 | Rohatgi |
| 5,935,699 A | 8/1999 | Barber |
| 5,967,211 A | 10/1999 | Lucas et al. |
| 6,034,155 A | 3/2000 | Espeland et al. |
| 6,048,593 A | 4/2000 | Espeland et al. |
| 6,207,077 B1 | 3/2001 | Burnell-Jones |
| 6,254,845 B1 | 7/2001 | Ohashi et al. |
| 6,444,162 B1 | 9/2002 | Anshits et al. |
| 6,461,988 B2 | 10/2002 | Budd et al. |
| 6,506,819 B1 | 1/2003 | Shukla et al. |
| 6,531,222 B1 | 3/2003 | Tanaka et al. |
| 6,572,697 B2 | 6/2003 | Gleeson et al. |
| 6,620,487 B1 | 9/2003 | Tonyan et al. |
| 6,626,991 B1 | 9/2003 | Drochon et al. |
| 6,648,961 B2 | 11/2003 | Brothers et al. |
| 6,656,265 B1 | 12/2003 | Garnier et al. |
| 6,660,078 B2 | 12/2003 | Brothers et al. |
| 6,667,261 B1 | 12/2003 | Tranter et al. |
| 6,811,603 B2 | 11/2004 | Brothers et al. |
| 6,814,798 B2 | 11/2004 | Vijn et al. |
| 2001/0043996 A1 | 11/2001 | Yamada et al. |
| 2002/0004111 A1 | 1/2002 | Matsubara et al. |
| 2002/0023436 A1 | 2/2002 | Meyer |
| 2002/0025436 A1 | 2/2002 | Meyer |
| 2003/0177955 A1 | 9/2003 | Vijn et al. |
| 2003/0177995 A1 | 9/2003 | Vijn et al. |
| 2004/0079260 A1 | 4/2004 | Datta et al. |
| 2004/0080063 A1 | 4/2004 | Datta et al. |
| 2004/0081827 A1 | 4/2004 | Datta |
| 2004/0262801 A1 | 12/2004 | Hojaji |
| 2005/0011412 A1 | 1/2005 | Vijn et al. |

FOREIGN PATENT DOCUMENTS

| | | |
|---|---|---|
| DE | 3213521 A1 | 6/1983 |
| DE | 3314796 | 10/1984 |
| DE | 3908172 | 2/1990 |
| DE | 19962137 | 6/2001 |
| EP | 0102092 | 3/1984 |
| EP | 0242872 | 4/1987 |
| EP | 0 359 362 B1 | 4/1995 |
| EP | 0 801 037 B1 | 8/2000 |
| EP | 1 156 021 A1 | 11/2001 |
| EP | 1 160 212 A1 | 12/2001 |
| EP | 1172341 | 1/2002 |
| EP | 0931778 | 4/2002 |
| EP | 0999232 | 3/2004 |
| EP | 0891954 | 4/2004 |
| GB | 682432 | 11/1952 |
| GB | 743866 | 1/1956 |
| GB | 744070 | 2/1956 |
| GB | 752345 | 7/1956 |
| GB | 896910 | 5/1962 |
| GB | 1062410 | 3/1967 |
| GB | 1 448 320 | 9/1976 |
| GB | 1515521 | 6/1978 |
| GB | 2330138 | 4/1999 |
| JP | 07024299 A2 | 1/1995 |
| JP | 07292846 A2 | 11/1995 |
| JP | 07315869 A2 | 12/1995 |
| JP | 08169779 A2 | 7/1996 |
| JP | 09020526 A | 1/1997 |
| JP | 09077543 | 3/1997 |
| JP | 9124327 A2 | 5/1997 |
| JP | 09255383 | 9/1997 |
| JP | 10095648 | 4/1998 |
| JP | 10152356 | 6/1998 |
| JP | 11116299 | 4/1999 |
| JP | 2000119050 | 4/2000 |
| JP | 2000143307 | 5/2000 |
| JP | 2000302498 | 10/2000 |
| JP | 2001163647 | 6/2001 |
| JP | 2001240439 | 9/2001 |
| JP | 2002003248 | 1/2002 |
| SU | 1650196 A | 5/1991 |
| WO | WO 85/00361 | 1/1985 |
| WO | WO 92/10440 | 12/1991 |
| WO | WO 96/07538 | 3/1996 |
| WO | WO 98/03284 | 1/1998 |
| WO | WO 98/29353 | 7/1998 |
| WO | WO 01/72863 | 10/2001 |
| WO | WO 2004/101137 A1 | 2/2004 |
| WO | WO 2004/018090 A1 | 3/2004 |

OTHER PUBLICATIONS

Office Action dated Apr. 27, 2005 to U.S. Appl. No. 10/648,009.
Office Action dated Jan. 11, 2005 to U.S. Appl. No. 10/648,184.
"Novel Raw Material for Producing Heat Insulating Materials," Pawlowski et al., *Silikattechnik* (1982), 33(11), 339-340.
Litigation Documents Corresponding to Civil Case Nos. SCVSS115246, 5:04-CV-00674-RT-SGL, 04-C-1621, 05-CV-44, and 04-CV-152.
P.K. Kolay, D.N. Singh, Physical, chemical, mineralogical, and thermal properties of cenospheres from an ash lagoon, Cement and Concrete Research, 2001, pp. 539-542, vol. 31.
What are Cenospheres, www.microspheres.co.za/contents.htm, printed Jul. 11, 2006.
Gubka, Composition and Morphology of Cenospheres Chemical & Physical Properties, www.atom.nw.ru/rie/projects/gubka/properties/cenospheres.shtml, printed Jul. 11, 2006.
Drozhzhin, V.S., Pikulin, I.V., Kuvaev, M.D., Redyushev, S.A., Shpirt, M.Y., Technical Monitoring of Microspheres from Fly Ashes of Electric Power Stations in the Russian Federation, New Products 3 presentation at International Ash Utilization Symposia and the World of Coal Ash Conference, 2005, available at http://whocares-caer.uky.edu/wasp/AshSymposium/AshLibraryAuthors.asp.
3M Material Safety Data Sheet, Apr. 10, 2006, pp. 1-7.
Corning Glass Works Brochure, 3 pp., undated.
U.S. Appl. No. 11/031,406 filed by EERC—abandoned due to preliminary injunction issued in favor of James Hardie International Finance B.V.
U.S. Appl. No. 11/031,829 filed by EERC—abandoned due to preliminary injunction issued in favor of James Hardie International Finance B.V.
Office Action mailed Jan. 10, 2008, for U.S. Appl. No. 10/648,585.
Office Action mailed Oct. 12, 2007, for U.S. Appl. No. 10/648,009.
Office Action mailed Mar. 20, 2007, for U.S. Appl. No. 10/648,184.
Office Action mailed Nov. 1, 2007, for U.S. Appl. No. 10/648,184.
Sphere Services Inc. "Cenospheres—Hollow Ceramic Microspheres" website article located at: http://www.sphereservices.com/ceno.html (2 pgs.), dated May 15, 2007.
"Technology Education—Glass" by Encyclopedia Britannica (4 pgs.) website article located at: http://www.geocities.com/tech_ed_2000/industrial/manufacturing/glass/glass.htm?20.. dated May 15, 2007.
Digital Fire Corporation "Do You Need to Know About Eutectics to Make a Good Glaze?" (4 pgs.) website article located at: http://www.digitalfire.ab.ca/cermat/education/119.php?PHPSESSID=1e2d7f3f3a24698394ecae57ed3b06d5 dated Jul. 14, 2003.

Fig. 192.—System $SiO_2$-$2Na_2O \cdot SiO_2$.

F. C. Kracek, *J. Phys. Chem.*, 34, 1588 (1930); *J. Am. Chem. Soc.*, 61, 2869 (1939).

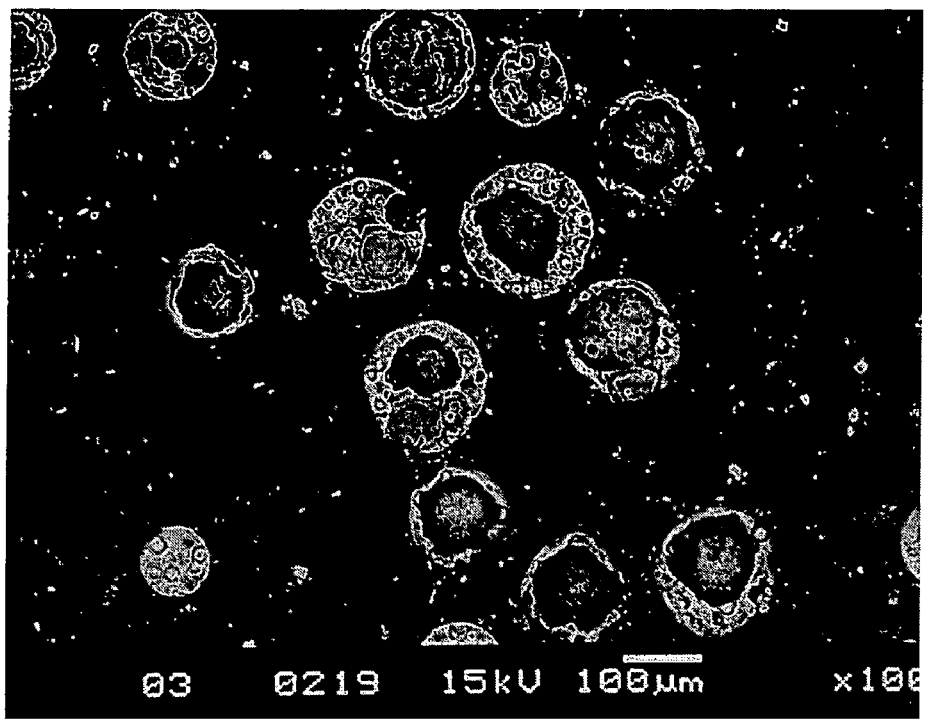
Figure 3 (product of Formulation 1A).
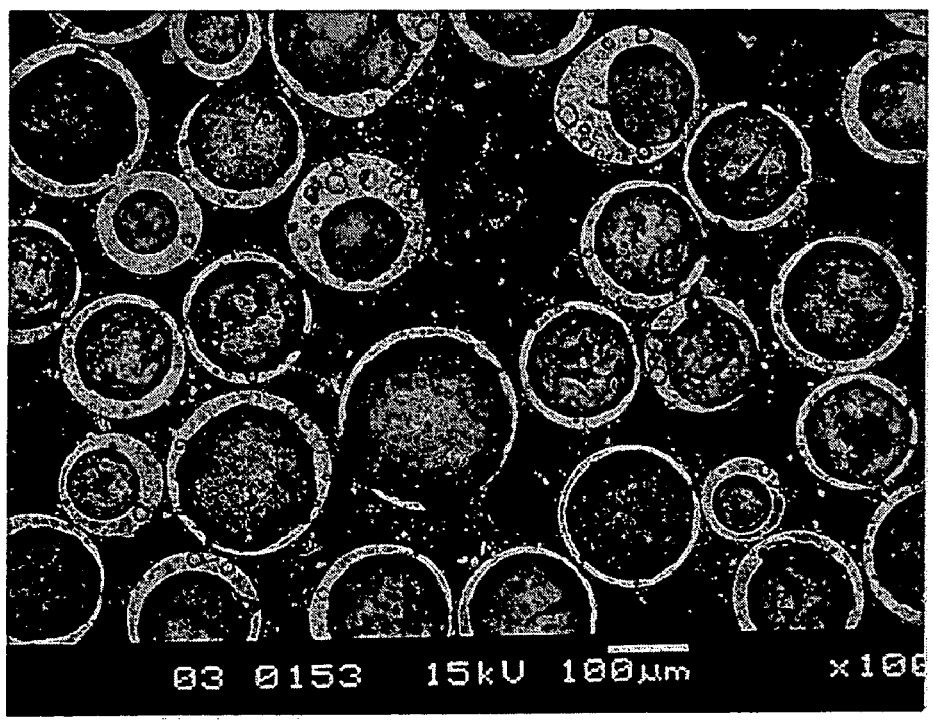
Figure 4 (product of Formulation 1B).

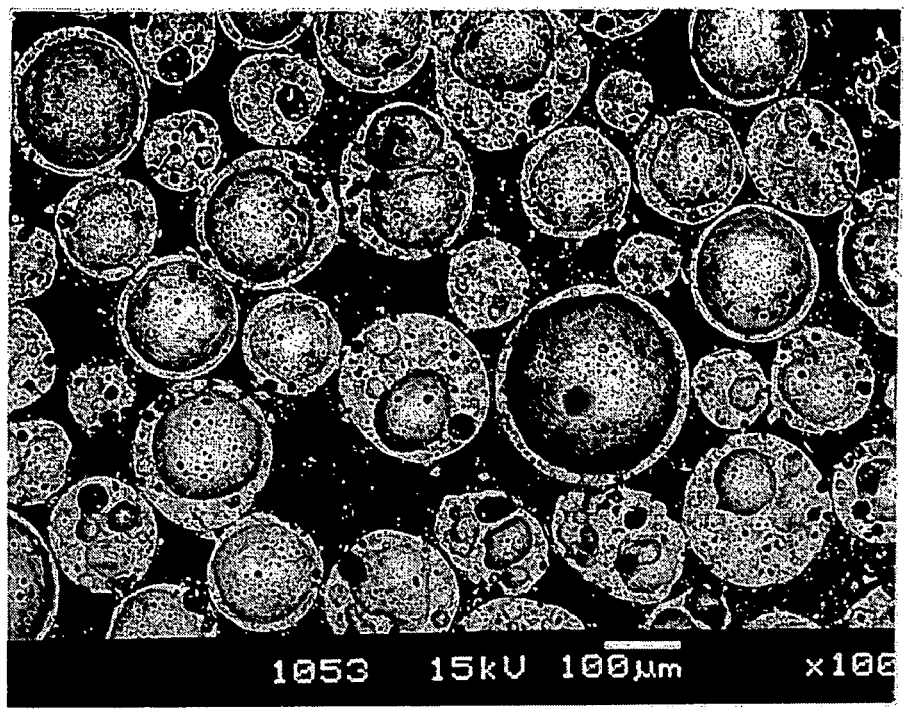
Figure 5 (product of Formulation 1C).
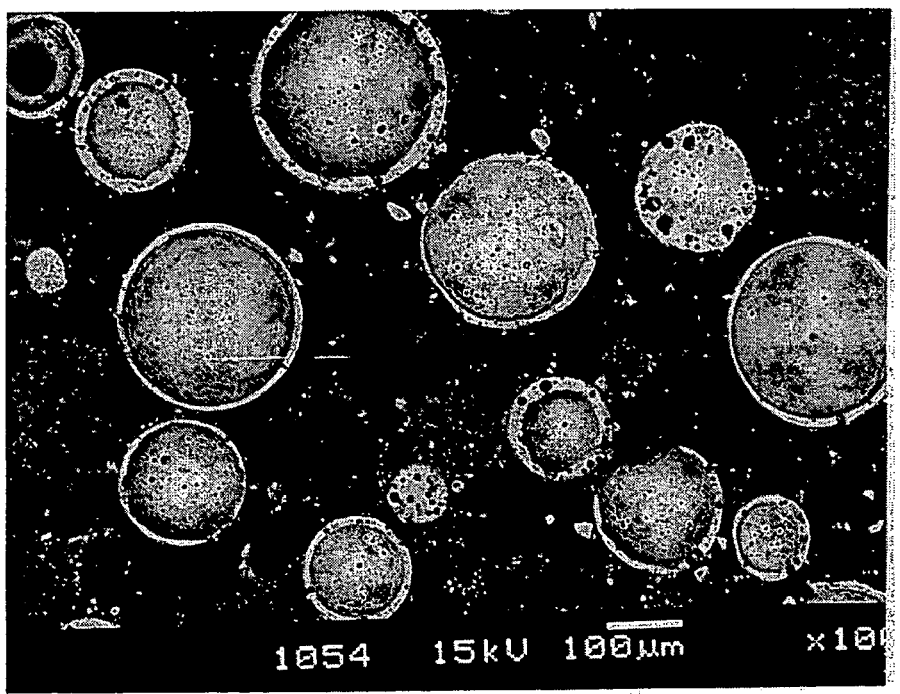
Figure 6 (product of Formulation 1D).

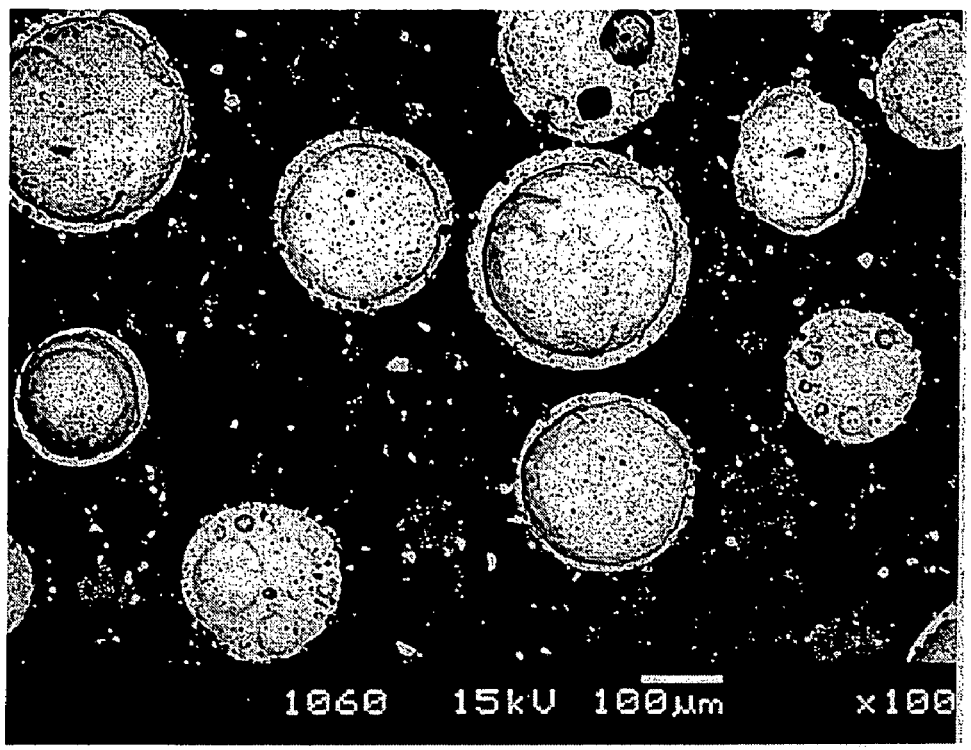
Figure 7 (product of Formulation 1E).
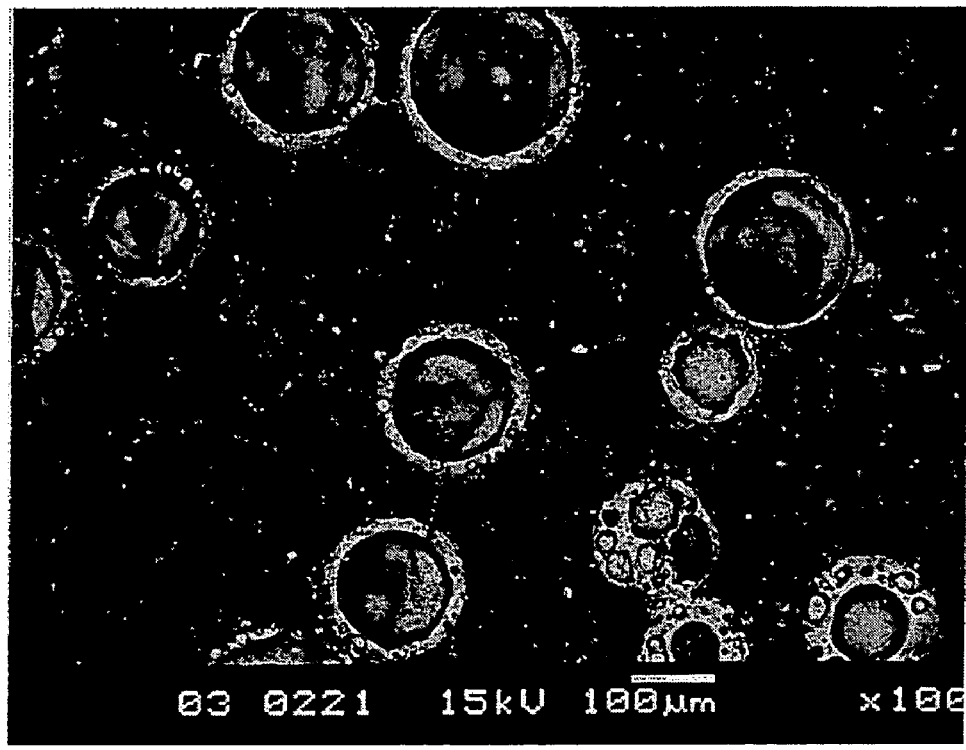
Figure 8 (product of Formulation 1F).

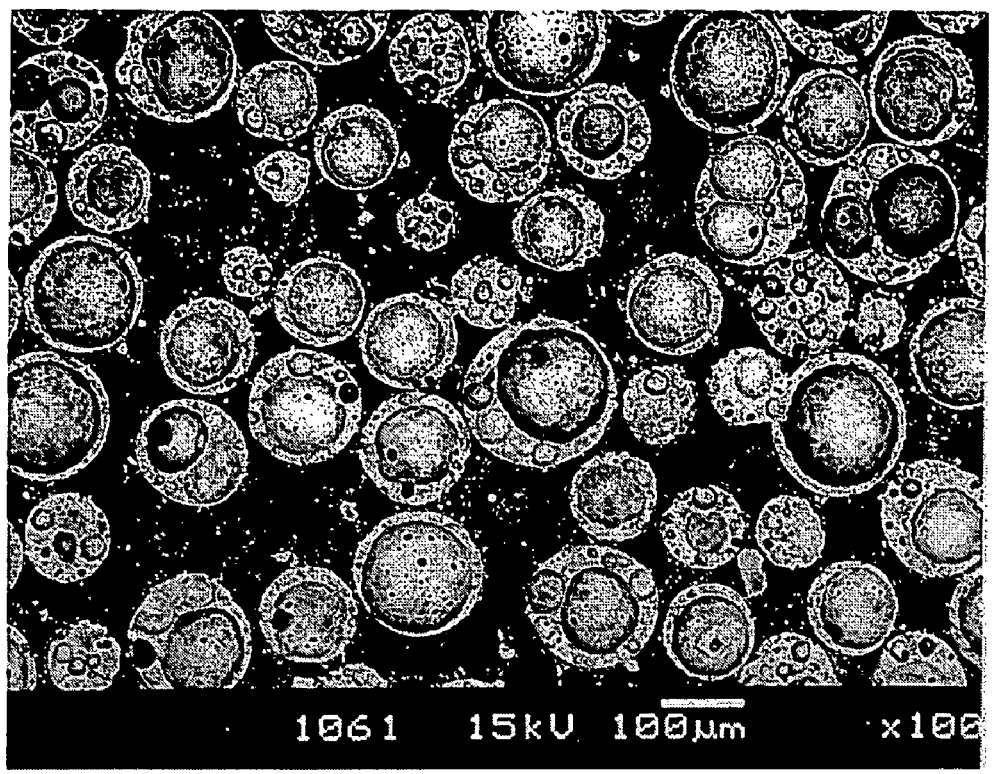
Figure 9 (product of Formulation 2A).
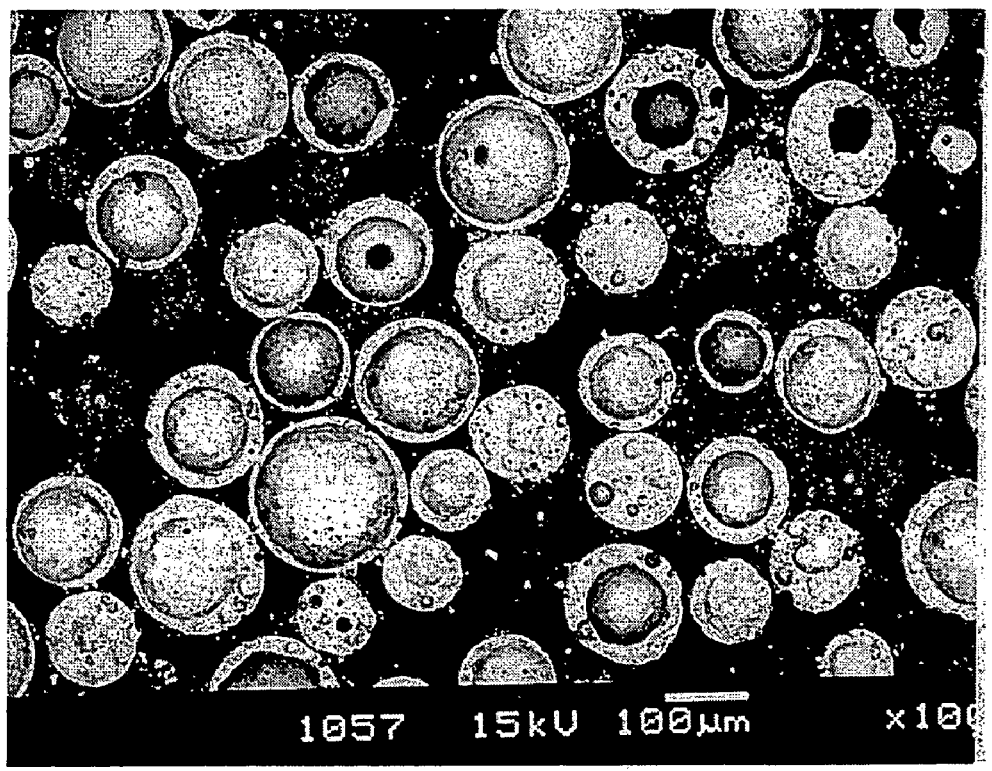
Figure 10 (product of Formulation 2B).

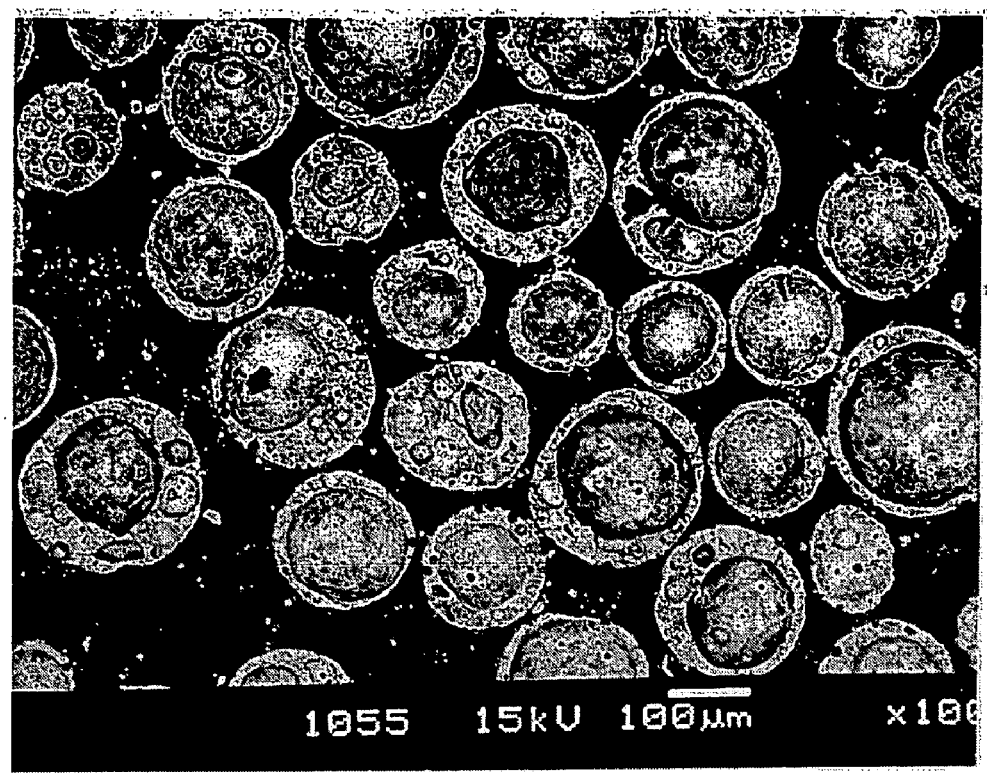
Figure 11 (product of Formulation 2C).
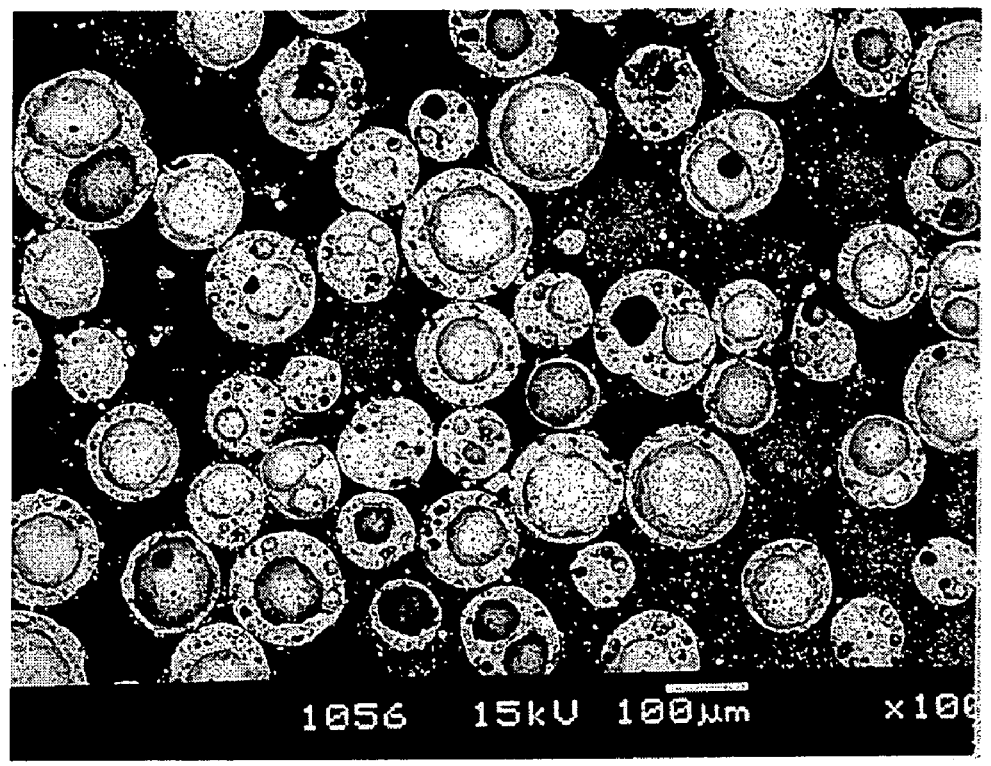
Figure 12 (product of Formulation 2D).

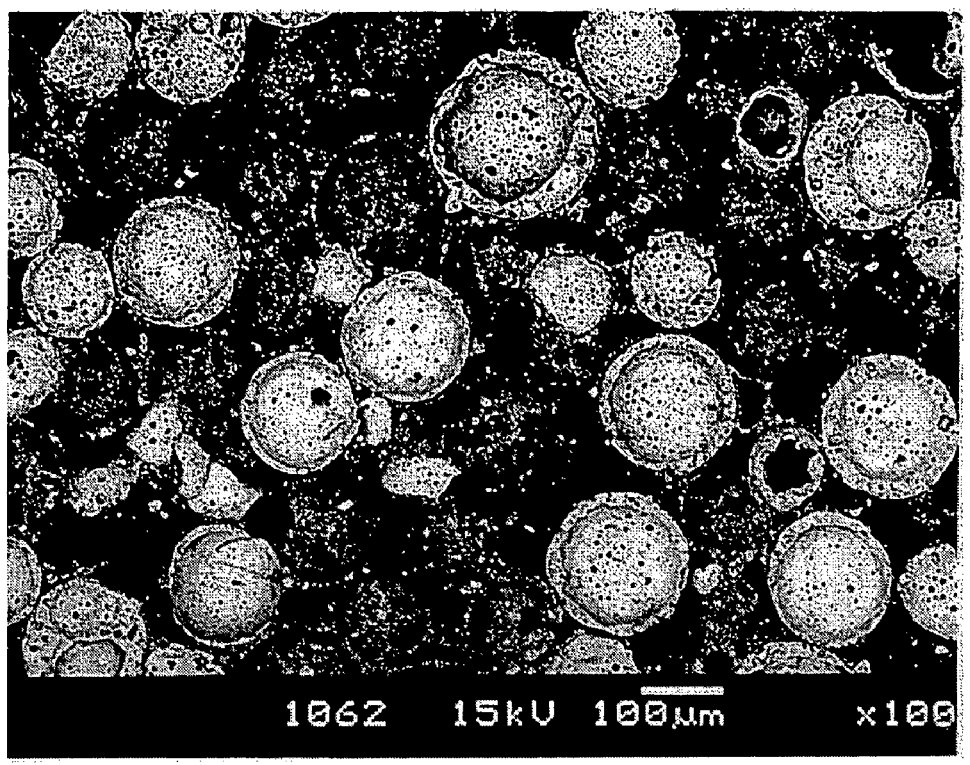
Figure 13 (product of Formulation 2E).
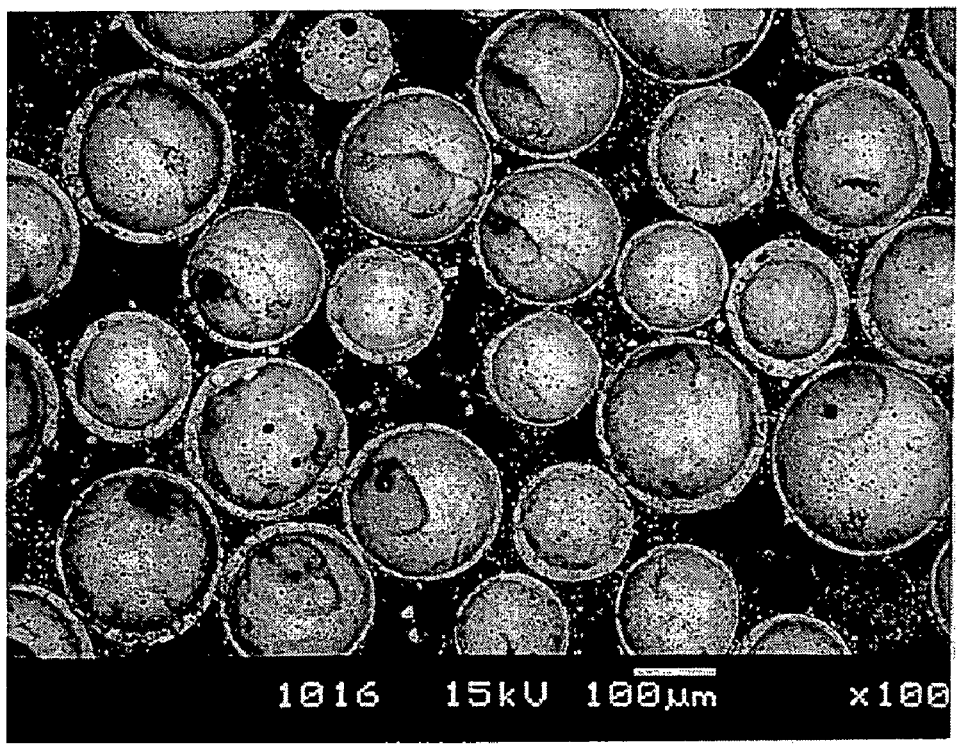
Figure 14 (product of Formulation 2F).

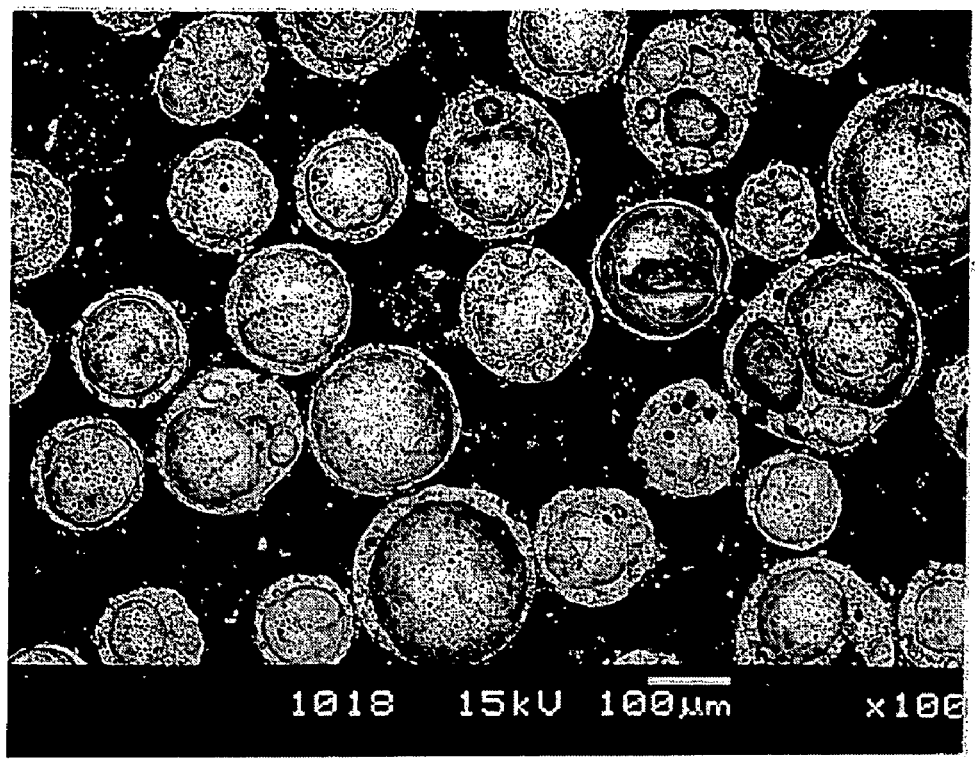
Figure 15 (product of Formulation 3A).
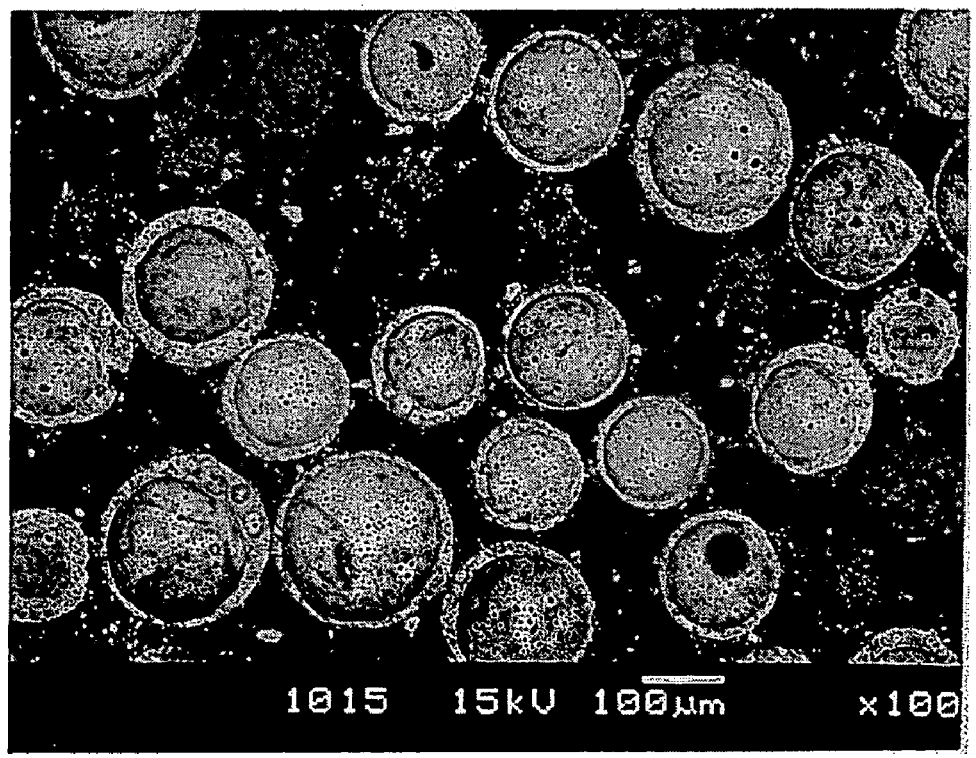
Figure 16 (product of Formulation 3B).

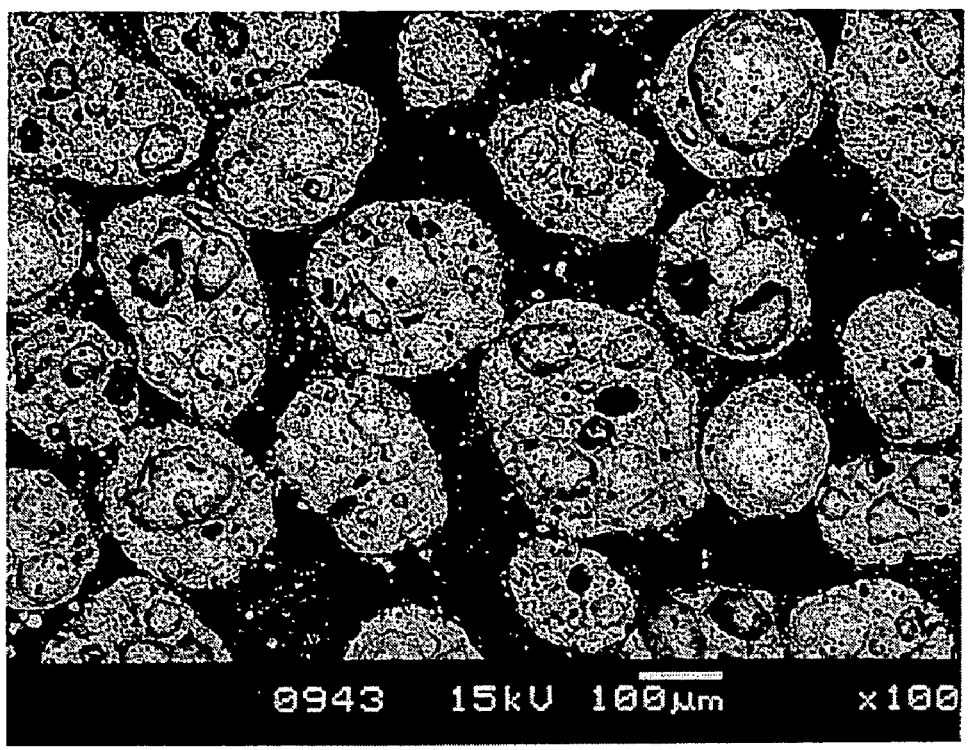
Figure 17 (product of Formulation 3C).
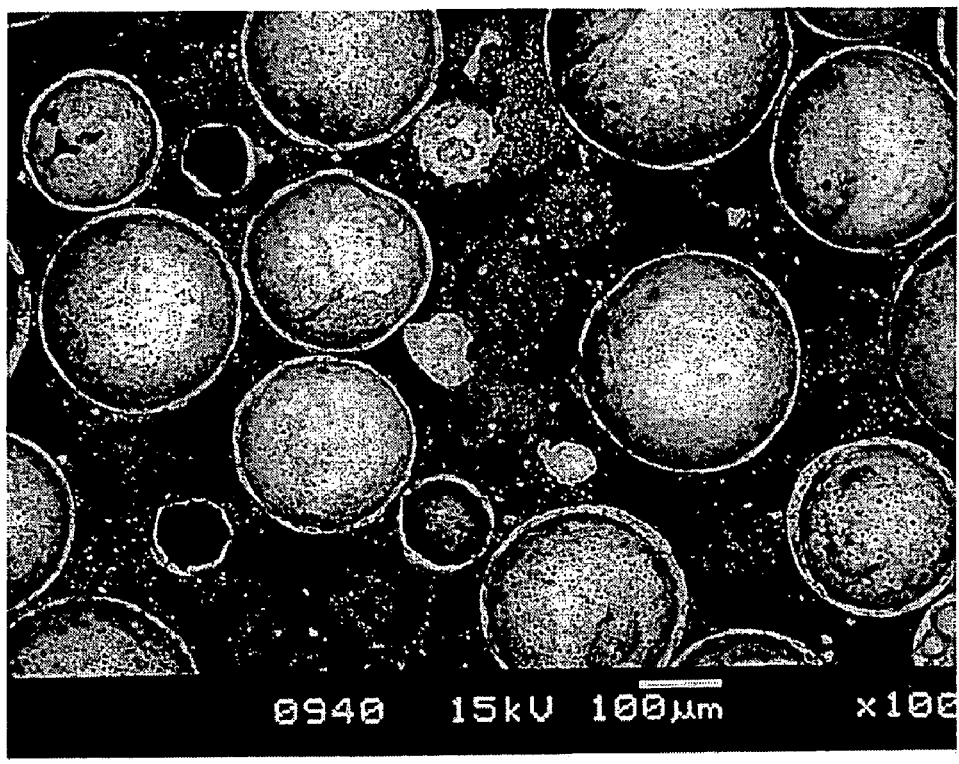
Figure 18 (product of Formulation 4A).

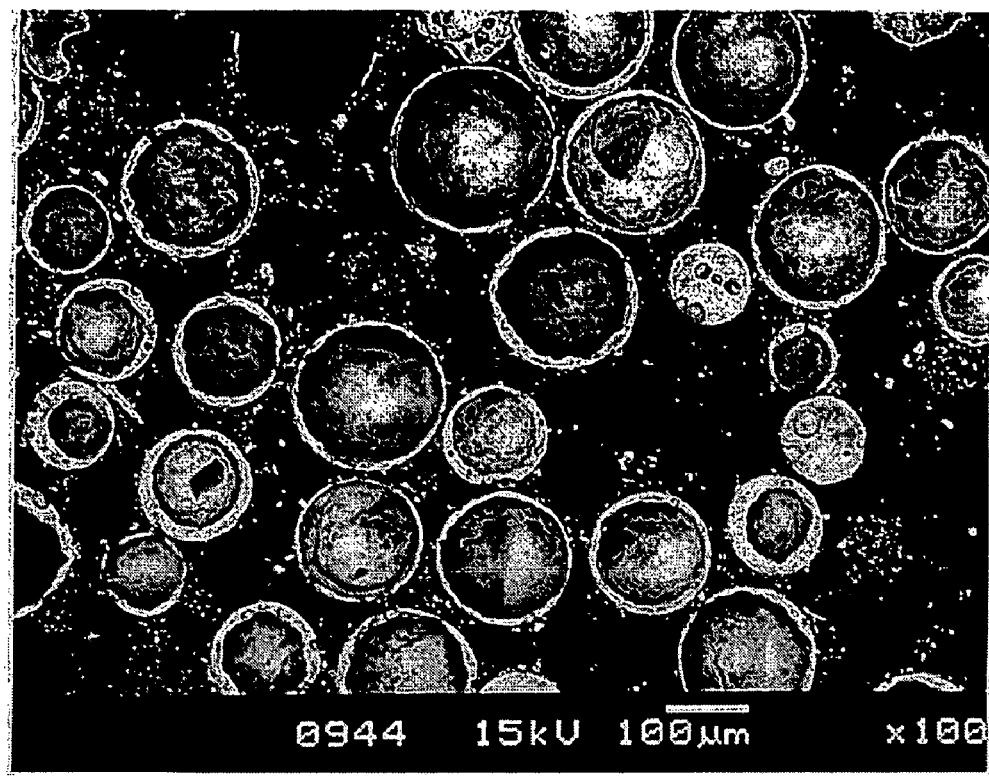
Figure 19 (product of Formulation 4B).
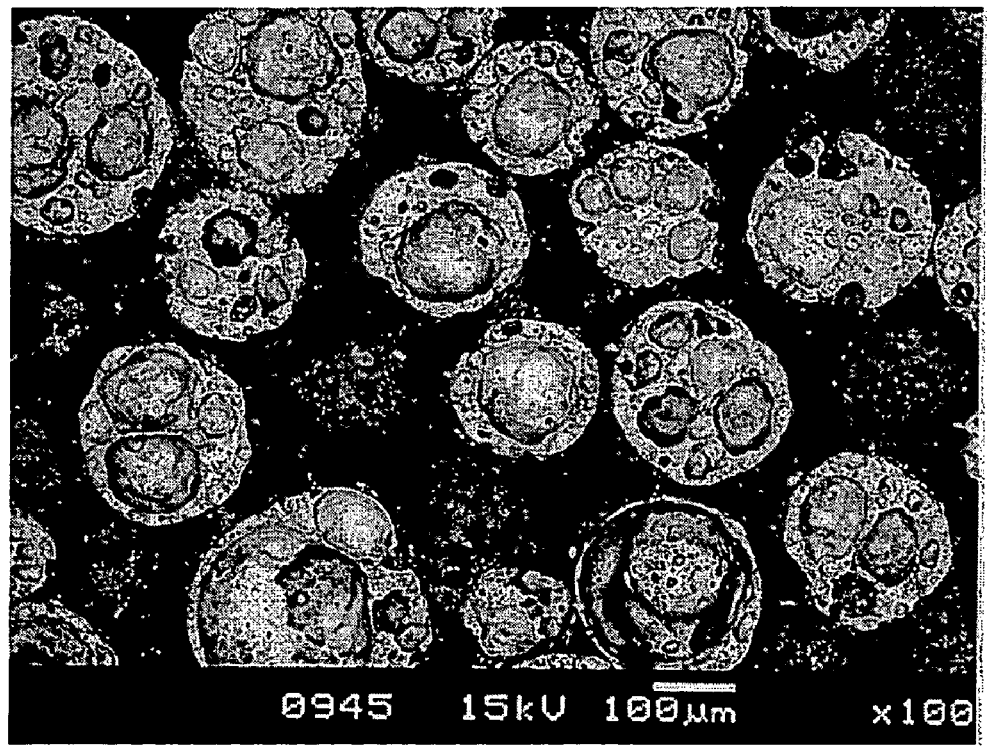
Figure 20 (product of Formulation 5A).

METHODS FOR PRODUCING LOW DENSITY PRODUCTS

RELATED APPLICATIONS

This application is a continuation-in-part of U.S. patent application Ser. No. 10/648,184, filed Aug. 25, 2003, now pending, which claims the benefit of U.S. Provisional Patent Application No. 60/405,790, filed Aug. 23, 2002 now abandoned, and U.S. Provisional Patent Application No. 60/471,400, filed May 16, 2003, now abandoned, the entirety of each of these references are herein incorporated by reference in their entirety.

BACKGROUND OF THE INVENTION

1. Field of the Invention

The present invention relates to methods and formulations for forming low density products and particularly, method and formulations for forming synthetic, expanded microparticles.

2. Description of the Related Art

Any discussion of the prior art throughout the specification should in no way be considered as an admission that such prior art is widely known or forms part of common general knowledge in the field.

Cenospheres are spherical inorganic hollow microparticles (microspheres) found in fly ash, which is produced as a by-product in coal-fired power stations. Cenospheres typically make up around 1-2% of the fly ash and "harvested" cenospheres are widely commercially available. The composition, form, size, shape and density of cenospheres provide particular benefits in the formulation and manufacture of many low-density products.

One of the characterizing features of cenospheres is their exceptionally high chemical durability. This exceptionally high chemical durability is understood to be due to the very low content of alkali metal oxides, particularly sodium oxide, in their composition. Accordingly, low-density composites produced from harvested cenospheres have the desirable properties of high strength to weight ratio and chemical inertness. Chemical inertness is especially important in Portland cement applications, where relative chemical inertness plays an important role in achieving highly durable cementitious products. Thus, harvested cenospheres have proven to be especially useful in building products and in general applications where they may come into contact with corrosive environments.

Despite the known utility of harvested cenospheres, their widespread use has been limited to a large extent by their cost and availability. The recovery of cenospheres in large quantities from fly ash is a labour intensive and expensive process. Although it is possible to increase the recovery of cenospheres from fly ash by modifying the collection process, the cost of improved recovery does not make this economically viable.

It may also be possible to alter combustion conditions in power stations to increase the yield of cenospheres in fly ash. However, combustion conditions in power stations are optimised for coal-burning rather than cenosphere production, and it is not economically viable to increase the yield of cenosphere production at the expense of coal-burning efficiency.

Several methods for producing microspheres are described in the prior art. An early method for manufacturing hollow glass microspheres involved combining sodium silicate and borax with a suitable foaming agent, drying and crushing the mixture, adjusting the size of the crushed particles and subsequently firing the particles. However, this method suffers from the use of expensive starting materials (e.g. borax). Hence, the resulting microspheres are necessarily expensive. In addition, the product has poor chemical durability due to a high percentage of sodium oxide in the resulting glass composition.

U.S. Pat. No. 3,365,315 describes a method of producing glass microspheres from glass beads by heating in the presence of water vapour at a temperature of about 1200° C. This method requires the exclusive use of pre-formed amorphous glasses as the starting raw materials.

U.S. Pat. No. 2,978,340 describes a method of forming glass microspheres from discrete, solid particles consisting essentially of an alkali metal silicate. The microspheres are formed by heating the alkali metal silicate at a temperature in the range of 1000-2500° F. in the presence of a gasifying agent, such as urea or $Na_2CO_3$.

US Patent Application No. 2001/0043996 (equivalent of EP-A-1156021) describes a spray combustion process for forming hollow microspheres having a diameter of from 1 to 20 microns. However, this process is unsuitable for making hollow microspheres having a diameter similar to that of known cenospheres (i.e. about 200 microns). In spray combustion processes, rapid steam explosion ruptures larger particles, thereby preventing formation of hollow microspheres greater than about 20 microns in diameter.

US Patent Application No. 2002/0025436 describes a process for forming solid microspheres from fly ash. The process is said to improve the spheroidal uniformity of fly ash particles and provides fly ash spheroids having a density of about 1.8 $g/cm^3$.

U.S. Pat. No. 4,826,788 discloses a method of using two blowing agents activated at different temperatures to make large, foam glass granules greater than 1 mm in diameter. However, the blowing agents discussed therein are limited to the blowing agents discussed therein are limited to one of the two agents must be an oxygen generating agent.

Generally speaking, prior art methods for forming engineered expanded microparticles involve firing an inorganic material in the presence of a blowing, gasifying or foaming agent. Such blowing, gasifying or foaming agents are typically activated when the material from which the microparticle is produced is in an appropriate form, such as liquid. However, it is sometimes extremely difficult to match the blowing agent with the material from which the microparticle will be formed and using the blowing agent in the most efficient manner.

In view of the foregoing, it would be desirable to have a system which allows a greater degree of control over the process of forming engineered expanded microparticles. It is an object of the present invention to overcome or ameliorate at least one of the disadvantages of the prior art, or to provide a useful alternative.

SUMMARY OF THE INVENTION

In one aspect, the preferred embodiments of the present invention provide a method for producing a low density material. The method comprises providing a precursor formed of an aqueous mixture of inorganic primary component and a blowing agent; drying the mixture; and firing the precursor to activate the blowing agent to expand the precursor and form a low density material, wherein activation of the blowing agent is controlled such that the blowing agent is activated within a predetermined optimal temperature range. In one embodiment, the method further includes grinding the precursor to a predetermined particle size. Preferably, the low density material is produced in the form of microparticles, most preferably with a particle size of up to about 1,000 microns. In a preferred embodiment, control of the blowing agent is accomplished by providing a control agent in the precursor which conserves and/or protects the blowing agent until the mixture reaches the aforementioned optimal temperature range.

The control agent can be provided in a number of forms. In one form, the control agents comprise materials which react under certain process conditions to alter the environment of the precursor and thereby control activation of the blowing agent. For instance, control agents can be in the form of additional blowing agents. To explain, the precursor formulation can include a primary blowing agent which acts primarily to expand the precursor material and form the expanded microparticles. Control agents in the form of secondary and tertiary blowing agents may be included in the precursor mixture. These blowing agents can be activated at lower temperatures than the primary blowing agent. Many blowing agents are activated by oxidation. Activating tertiary and/or secondary blowing agents results in scavenging of oxygen from the process environment thereby controlling activation of the primary blowing agent. As will be clear to a person skilled in the art, this allows conservation and release of the primary blowing agent within the preferred optimal temperature range providing better control and more efficient use of the blowing agent in the process.

Control of the blowing agent can be accomplished by a variety of means. For instance the process could be run within an oxygen deficient environment thereby reducing exposure of the blowing components to oxygen. When the precursor mixture reaches the optimal temperature range, oxygen could be introduced to the process to thereby activate the blowing agent.

Another alternative is to run the firing process in a fuel rich fashion, ie less oxidising. Other firing mechanisms such as plasma heating etc could be used with appropriate dosing of $O_2$ depleting or $O_2$ enriching gases to control activation of the blowing agent.

In still a further embodiment, conservation of the blowing agent can be accomplished physically. Distribution of the blowing agent throughout the precursor particles can be such that at least some of the blowing component is maintained within the core of the precursor away from the surface. When such a precursor particle is subjected to heat, the surface temperature will rise and the core temperature will lag behind the surface temperature. This temperature differential will be engineered such that the blowing agent is activated only when substantially the entire precursor particle reaches the optimal temperature range.

In one embodiment, the optimal temperature range is one in which the precursor mixture reaches the optimal viscosity for the expansion process. The optimal temperature range will depend upon a number of parameters including the make up on the inorganic primary component, the make up of the blowing agents and control agents, precursor particle size, desired density of resultant low density material.

In a second aspect, the preferred embodiments of the present invention provide a method of forming a precursor for a low density material. The method comprises the steps of providing an inorganic primary component; forming an aqueous mixture of the inorganic primary component, a blowing agent and a control agent, and drying the mixture to provide an expandable precursor for forming a low density material wherein the blowing agent and control agent are selected to control activation of the blowing agent such that the blowing agent is activated within a predetermined optimal temperature range.

In a third aspect, the preferred embodiments of the present invention provide a method of forming a precursor for a low density material. The method comprises the steps of providing an inorganic primary component; forming an aqueous mixture of the inorganic primary component and a blowing agent; and drying the mixture to provide an expandable precursor for forming a low density material wherein the blowing agent is selected and/or distributed in the precursor to control activation of the blowing agent upon firing of the precursor such that the blowing agent is activated within a predetermined optimal temperature range.

In a fourth aspect, the preferred embodiments of the present invention provide a precursor suitable for producing expanded micro particles. The precursor comprises an expandable inorganic primary component, a blowing agent adapted to be activated and thereby expand the primary component, and a control agent selected to control activation of the blowing agent such that the blowing agent is activated within a predetermined optimal temperature range.

In a fifth aspect, the preferred embodiments of the present invention provide a precursor suitable for producing expanded micro particles. The precursor comprises an expandable inorganic primary component and a blowing agent selected and/or distributed within the precursor to control activation of the blowing agent whereby upon firing of the precursor to produce the expanded micro particles, the blowing agent is activated within a predetermined optimal temperature range.

In a sixth aspect, the preferred embodiments of the present invention provide a method of controlling activation of the blowing agent in an inorganic mixture to produce expanded micro particles. The method comprises providing at least one blowing agent which is activated under predetermined conditions to release a blowing gas and produce expanded micro particles and controlling such conditions whereby said activation takes place within a predetermined optimal viscosity range of the inorganic mixture.

In a seventh aspect, the preferred embodiments of the present invention provide a blowing component for producing expanded microparticles. The blowing component comprising a primary blowing agent and a predetermined quantity of compatible control agent wherein upon inclusion of such a blowing component within an expandable mixture, the control agent may be activated prior or simultaneously with the blowing agent to control and conserve the blowing agent.

In a preferred embodiment, the control agent is activated at a lower temperature than the blowing agent. The control agent may act to alter the process environment and render it less conducive to activation of the blowing agent. In one embodiment, the control agent may act to alter the oxygen content for scavenge oxygen from the process environment and thereby render such an environment less conducive to an oxidation activatable blowing agent. In another preferred embodiment, the blowing component/agent comprises a series of blowing compounds adapted to be sequentially activated over a range of process conditions.

In another aspect, the preferred embodiments of the present invention provide a method of controlling activation of a blowing agent in an inorganic mixture to produce expanded microparticles. The method comprises providing at least one blowing agent which is activated under predetermined conditions to release a blowing gas and produce expanded microparticles and controlling conditions such that said activation takes place within a predetermined optimal viscosity range of the inorganic mixture. In one embodiment, the inorganic mixture melts at relatively high temperatures and the blowing agent is preferably activated when the inorganic mixture is at optimal viscosity. As will be clear to persons skilled in the art, this will provide a higher yield from the expansion process. Accordingly, certain preferred embodiments of the present invention provide a mechanism for tailoring the blowing agent such that it is activated at the optimal viscosity of the inorganic mixture, such as within a particular temperature range.

BRIEF DESCRIPTION OF THE DRAWINGS

FIG. 3 to 8 are scanning electron micrographs of synthetic hollow microspheres obtained from Example 1;

FIG. 9 to 14 are scanning electron micrographs of synthetic hollow microspheres obtained from Example 2;

FIG. 15 to 17 are scanning electron micrographs of synthetic hollow microspheres obtained from Example 3; and FIG. 18 to 19 are scanning electron micorgraphs of synthetic hollow microspheres obtained from Example 4; and FIG. 20 is a scanning electron micorgraphs of synthetic hollow microspheres obtained from Example 5.

DETAILED DESCRIPTION OF THE PREFERRED EMBODIMENT

Figure 1:
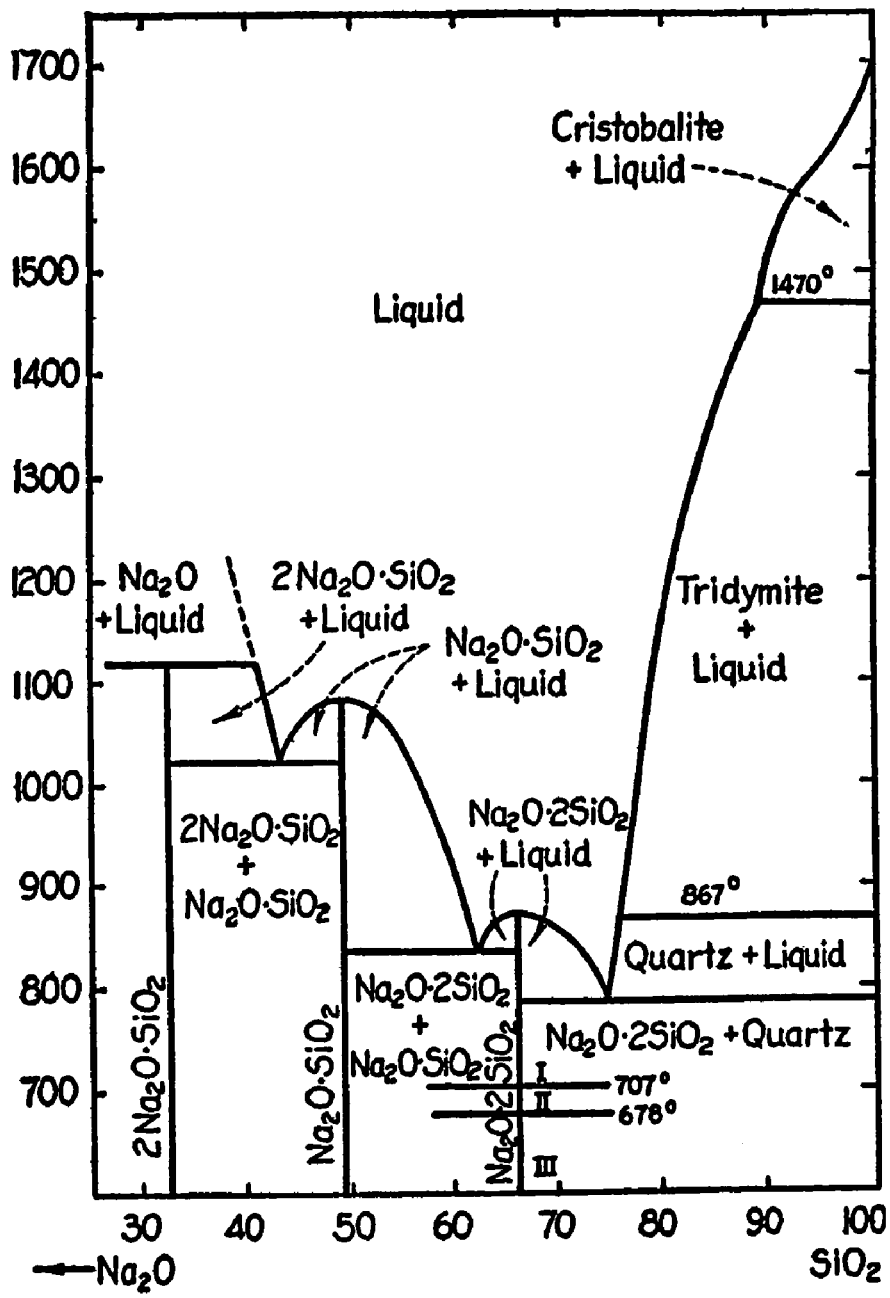
FIG. 1 is a phase equilibrium diagram for binary system $Na_2O$—$SiO_2$, the composition being expressed as a weight percentage of $SiO_2$.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

As used herein, the term "engineered/expanded microparticle" means a hollow microparticle synthesized as a primary target product of a synthetic process. The term does not include, for example, harvested natural cenospheres which are merely a by-product of burning coal in coal-fired power stations.

Although the terms "microsphere" and "microparticle" are used throughout the specification, it will be appreciated that these terms are intended to include any substantially rounded discrete microparticle, including those that are not true geometric spheres.

As used herein, the term "precursor" refers to the agglomerate or particle made from the suitable formulation prior to its expansion to form one or more expanded microparticles. The term "control agent" refers to a components included in the precursor which controls activation of the blowing component.

As used herein, the term "primary component" means that this component is usually the major constituent of the formulation/precursor, in the sense that the amount of primary component usually exceeds the amounts of the other constituents. Moreover, the term "inorganic primary component" means that the primary component consists essentially of inorganic materials. However, small amounts (e.g. up to about 10 wt. %) of other materials, including organic components, may still be included in the inorganic primary component.

As used herein the term "activation" refers to the conditions, such as temperature, redox of the oxides present in the formulation, and gaseous atmosphere during thermal treatment (such oxygen partial pressure) range at which a blowing component is activated and releases its blowing gas.

The preferred embodiments of the present invention advantageously provide a means for producing expanded microparticles in excellent yield from widely available and inexpensive starting materials. Hence, the preferred embodiments reduce the overall cost of producing microparticles, and consequently increase the scope for their use, especially in the building industry, and all filler applications such as in polymeric composites where the use of presently available cenospheres is relatively limited due to their prohibitive cost and low availability. As will be described in greater detail below, certain preferred embodiments of the present invention are directed toward controlling activation of the blowing agent(s) in achieving reliable synthesis of expanded microparticles from a wide range of materials.

Methods of Forming Precursor to the Expanded Microparticle

In certain embodiments, the precursor for producing the expanded microparticle can be produced by combining the primary component, blowing component and optionally, control agent in an aqueous mixture. This aqueous mixture is then dried to produce an agglomerated precursor. As described above, the preferred embodiments of the present invention provide a method of forming a precursor, which includes the steps of mixing and drying. The resultant precursor is generally a substantially solid agglomerate mixture of its constituent materials.

Typically, the mixing step provides an aqueous dispersion or paste, which is later dried. Mixing can be performed by any conventional means used to blend ceramic powders. Examples of preferred mixing techniques include, but are not limited to, agitated tanks, ball mills, single and twin screw mixers, and attrition mills. Certain mixing aids such as, surfactants may be added in the mixing step, as appropriate. Surfactants, for example, may be used to assist with mixing, suspending and dispersing the particles.

Drying is typically performed at a temperature in the range of about 30 to 600° C. and may occur over a period of up to about 48 hours, depending on the drying technique employed. Any type of dryer customarily used in industry to dry slurries and pastes may be used. Drying may be performed in a batch process using, for example, a stationary dish or container. Alternatively, drying may be performed in a spray dryer, fluid bed dryer, rotary dryer, rotating tray dryer or flash dryer.

Preferably, the mixture is dried such that the water content of the resultant agglomerate precursor is less than about 14 wt. %, more preferably less than about 10 wt. %, more preferably less than about 5 wt. %, and more preferably about 3 wt. % or less. It was found that, in certain embodiments, with about 14 wt. % water or more in the precursor, the precursor tends to burst into fines upon firing. It is understood by the present inventors that this bursting is caused by rapid steam explosion in the presence of too much water. Hence, in certain embodiments, the resultant precursor should preferably be substantially dry, although a small amount of residual moisture may be present after the solution-based process for its formation. In some embodiments, a small amount of water may help to bind particles in the precursor together, especially in cases where particles in the precursor are water-reactive.

Preferably, the dried precursor particles have an average particle size in the range of about 10 to 1000 microns, more preferably about 30 to 1000 microns, more preferably about 40 to 500 microns, and more preferably about 50 to 300 microns. The particle size of the precursor will be related to the particle size of the resultant synthetic hollow microsphere, although the degree of correspondence will, of course, only be approximate. If necessary, standard comminuting/sizing/classification techniques may be employed to achieve the preferred average particle size.

Method of Forming Precursor Using a Spray Dryer

Drying is preferably performed using a spray dryer having an aqueous feed. It has been found that spray drying has at least several advantages when used in the preferred embodiments of the present invention. As discussed above, the preferred embodiments of the present invention envisage various techniques for controlling activation of the blowing agent such that it is activated at a pre-determined (e.g. optimal temperature) point in the production process. Such control can be achieved by combining a control agent in the precursor formulation. Another embodiment includes a series of control agents and/or blowing agents such that there is sufficient blowing/expanding gas available at the optimal temperature. In one embodiment, a series of blowing agents may be used which are sequentially activated as temperature rises.

Yet a further embodiment involves distributing the blowing agent throughout the precursor such that while the precursor is being fired, the blowing agent distributed near the surface is exposed to a high temperature but the blowing agent near the core of the precursor is "physically" protected. To explain, the thermal conductivity of the formulation causes a delay between application of heat on the surface of the precursor to temperature rise within the core of the precursor. Accordingly, blowing agent which is within the core of the precursor will not be activated until a major portion of the precursor particle has already reached its optimal temperature.

Still further, as discussed above, many blowing agents are activated by oxidation. Particles within the core of the precursor will not be exposed to oxygen to the same extent as blowing agent on the surface, further protecting the blowing agent in the core of the particle.

Rather surprisingly, the Applicant has found that spray dryers are not only useful for forming precursors to the expanded microparticles but are also excellent at providing the aforementioned optimal distribution of the blowing agent within the precursor. Not wishing to be bound by any particular theory, it would appear that blowing agents which are water soluble tend to come to the surface during the spray dry production technique. Non water soluble blowing agents tend to remain within the core. Accordingly, one can design a mixture of blowing agents which provide initial, subsequent and final activation according to their water solubility. An example may be sugar which is useful as a blowing agent but is water soluble. During the spray dry technique, this blowing agent will tend to migrate to the surface of the precursor. Silicone carbide on the other hand, which is also a useful blowing agent is non water soluble and does not migrate to the surface of the precursor.

Spray dryers are described in a number of standard textbooks (e.g. *Industrial Drying Equipment*, C. M. van't Land; *Handbook of Industrial Drying* $2^{nd}$ *Edition*, Arun S. Mujumbar) and will be well known to the skilled person.

In addition to the aforementioned advantages, it is generally desirable to synthesize expanded microparticles having a predetermined average particle size and a predetermined, preferably narrow, particle size distribution. The use of a spray dryer in certain preferred embodiments of the present invention has been found to reduce the need for any sizing/classification of the precursors or, ultimately, the synthetic expanded microparticles. Spray drying has the additional advantage of allowing a high throughput of material and fast drying times. Hence, in a particularly preferred embodiment of the present invention, the drying step is performed using a spray dryer.

It has been determined that the particle size and particle size distribution can be affected by one or more of the following parameters in the spray drying process:
  inlet slurry pressure and velocity (particle size tends to decrease with increasing pressure);
  design of the atomizer (rotary atomizer, pressure nozzle, two fluid nozzle or the like)
  design of the gas inlet nozzle;
  volume flow rate and flow pattern of gas; and
  slurry viscosity and effective slurry surface tension.

Preferably, the aqueous slurry feeding the spray dryer comprises about 25 to 75% w/v solids, more preferably about 40 to 60% w/v solids.

In addition to the ingredients described above, the aqueous slurry may contain further processing aids or additives to improve mixing, flowability or droplet formation in the spray dryer. Suitable additives are well known in the spray drying art. Examples of such additives are sulphonates, glycol ethers, cellulose ethers and the like. These may be contained in the aqueous slurry in an amount ranging from about 0 to 5% w/v.

In the spray drying process, the aqueous slurry is typically pumped to an atomizer at a predetermined pressure and temperature to form slurry droplets. The atomizer may be one or a combination of the following: an atomizer based on a rotary atomizer (centrifugal atomization), a pressure nozzle (hydraulic atomization), or a two-fluid pressure nozzle wherein the slurry is mixed with another fluid (pneumatic atomization).

In order to ensure that the droplets formed are of a proper size, the atomizer may also be subjected to cyclic mechanical or sonic pulses. The atomization may be performed from the top or from the bottom of the dryer chamber. The hot drying gas may be injected into the dryer co-current or counter-current to the direction of the spraying.

It has been found that by controlling the spray drying conditions, the average particle size of the precursors and the precursor particle size distribution can be controlled. For example, a rotary atomizer has been found to produce a more uniform agglomerate particle size distribution than a pressure nozzle. Furthermore, rotating atomizers allow higher feed rates, suitable for abrasive materials, with negligible blockage or clogging. In some embodiments, a hybrid of known atomizing techniques may be used in order to achieve agglomerate precursors having the desired characteristics.

The atomized droplets of slurry are dried in the spray dryer for a predetermined residence time. The residence time can affect the average particle size, the particle size distribution and the moisture content of the resultant precursors. The residence time is preferably controlled to give the preferred characteristics of the precursor, as described above. The residence time can be controlled by the water content of the slurry, the slurry droplet size (total surface area), the drying gas inlet temperature and gas flow pattern within the spray dryer, and the particle flow path within the spray dryer. Preferably, the residence time in the spray dryer is in the range of about 0.1 to 10 seconds, although relatively long residence times of greater than about 2 seconds are generally more preferred. Preferably, the inlet temperature in the spray dryer is in the range of about 300 to 600° C. and the outlet temperature is in the range of about 90 to 220° C.

Spray drying advantageously produces precursors having this narrow particle size distribution. Consequently, synthetic expanded microparticules resulting from these precursors will have a similarly narrow particle size distribution and consistent properties for subsequent use.

A further surprising advantage of using a spray dryer is that the resultant precursors have an improved intra-particle distribution of constituents. While the atomized droplets are resident in the spray dryer, water is rapidly pulled from the interior to the exterior, thus forming a concentration gradient of soluble species in the agglomerate, with relatively water-soluble species being more concentrated towards the exterior. Another advantage of spray drying is to form dried cellulated agglomerated precursors according to the method of present invention (e.g. pre-foaming). The entrained gas will further expand during the foaming process to lower the density of the product which otherwise may not have been possible to achieve with multi blowing agents. By this optional and yet novel method, low temperature gas forming compounds are added to the precursor before the drying process. The gas forming compound can be activated either by physical means such as degassing due to a reduction in surface tension (reverse temperature solubility), or by chemical means. An example of chemical gasification at low temperature is decomposition of carbonates to $CO_2$ by changing the pH, or use of appropriate organic compounds such as air entraining agents customarily used in concrete.

For an efficient and reliable synthesis of hollow microspheres, the precursor should preferably have a high concentration of glass-forming material at the surface, which can form a molten glassy skin during firing. Furthermore, the precursor should preferably have a concentration of blowing agent near the core, which can release a blowing gas for entrapment within the glassy skin during firing. With careful selection of materials, this preferred intra-particle distribution can be achieved using the spray drying method.

Inorganic Primary Component

Preferably, the amount of inorganic primary component comprises at least about 40 wt. % based on the total dry weight of the agglomerate precursor, more preferably at least about 50 wt. %, more preferably at least about 60 wt. %, more preferably at least about 70 wt. % and more preferably at least about 80 wt. %.

The preferred ratio of primary component to other components, such as blowing agent, will vary, depending on the composition of each of these ingredients. Typically, the ratio of primary component to blowing agent will be in the range of about 1000:1 to about 10:1, more preferably, about 700:1 to about 15:1, and more preferably about 500:1 to about 20:1.

Preferably, the inorganic primary component comprises at least one material selected from inorganic oxides, non-oxides, salts or combinations thereof. Such materials may be industrial and/or residential by-products, minerals, rocks, clays, technical grade chemicals or combinations thereof. One of the advantages of the preferred embodiments of the present invention is that it allows the synthesis of hollow microspheres from inexpensive industrial and/or residential waste products. Accordingly, the inorganic primary component may comprise materials such as fly ash, bottom ash, blast-furnace slag, paper ash, waste glasses (e.g. soda lime glasses, borosilicate glasses or other waste glasses), waste ceramics, kiln dust, waste fibre cement, concrete, incineration ash, diatomaceous earth, silica sand, silica fume, or combinations thereof.

Preferably, the inorganic primary component is capable of forming a viscoelastic liquid when heated to a predetermined temperature. This viscoelastic liquid is preferably a glass-forming liquid. Preferably, the inorganic primary component comprises at least one compound in an oxide form, which can form a majority of a glass phase. Non-oxide components may oxidize and become part of the glass phase, except for those elements that can remain dissolved but not oxidized, such as halides.

In one preferred embodiment, the inorganic primary component comprises at least one silicate material. Silicate materials are well known to the person skilled in the art. Generally, these are materials having a relatively large component of silica ($SiO_2$) (i.e. greater than about 30 wt. %, preferably greater than about 50% and more preferably greater than about 60%). In most cases alumina is also a major oxide constituents of the silicate materials. The term of silicate in the preferred embodiments of the present invention hence covers all the aluminosilicate materials suitable as primarily compounds.

The amounts of silica and alumina in the silicate material will vary depending on the source and may even vary within the same source. Fly ash, for example, will contain varying amounts of silica and alumina depending on the type of coal used and combustion conditions. Preferably, the mass ratio of silica ($SiO_2$) to alumina ($Al_2O_3$) is greater than about 1. Typically, silicate materials for use in this preferred embodiment of the present invention have a composition of about 30 to 95 wt. % $SiO_2$; about 0 to 45 wt. % (preferably about 2 to 45 to wt. %) $Al_2O_3$; up to about 30 wt. % (preferably up to about 15 wt. %) divalent metal oxides (e.g MgO, CaO, SrO, BaO); up to about 50 wt. % monovalent metal oxides (e.g. $Li_2O$, $Na_2O$, $K_2O$); and up to about 20 wt. % of other metal oxides, including metal oxides which exist in multiple oxidation states (e.g. $SnO_2$, $MnO_2$, $Fe_2O_3$ etc.).

Typical silicates, which may be used in certain embodiments of the present invention are fly ash (e.g. Type F fly ash, Type C fly ash etc.), waste glass, bottom ash, blast-furnace slag, paper ash, basaltic rock, andesitic rock, feldspars, silicate clays (e.g. kaolinite clay, illite clay, bedalite clay, bentonite clay, china, fire clays etc.), bauxite, obsidian, volcanic ash, volcanic rocks, volcanic glasses, geopolymers or combinations thereof.

Silicates, such as those described above, may form the majority of the inorganic primary component. For example, silicates may form at least about 50 wt. %, at least about 70 wt. %, or at least about 90 wt. % of the inorganic primary component, based on the total weight of the inorganic primary component.

Fly ash, waste soda lime glass, andesitic rock, basaltic rock and/or clays are preferred source materials for the inorganic primary component. Fly ash is a particularly preferred inorganic primary component due to its low cost and wide availability. In one form of the invention, the primary component comprises at least about 5 wt. % fly ash, and more preferably at least about 10 wt. % fly ash, based on the total amount of primary component. In another form of the invention, the inorganic primary component comprises at least about 50 wt. % fly ash, at least about 70 wt. % fly ash, or at least about 90 wt. % fly ash, based on the total amount of inorganic primary component. In some embodiments of the present invention, the inorganic primary component may include a geopolymer, which is formed when a silicate is contacted with an aqueous solution of a metal hydroxide (e.g. NaOH or KOH). Geopolymers are well known in the art.

The inorganic primary component may be either calcined or non-calcined. The term "calcined" means that the inorganic material has been heated in air to a predetermined calcination temperature for a predetermined duration so as to either oxidise or pre-react certain component(s). Calcination of the inorganic material may be advantageous in the present invention since the blowing (expansion) process can be sensitive to the redox state of multivalent oxide(s) present in the inorganic material. Without wishing to be bound by theory, it is believed that activation of the blowing agents is influenced by the release of oxygen from multivalent oxide(s) present in the inorganic material (e.g. by redox reaction). As an example, a carbonaceous blowing agent may react with oxygen released from ferric oxide ($Fe_2O_3$) to form $CO_x$, (where x can be 1 or 2 depending on carbon oxidation state) which is in turn reduced to ferrous oxide (FeO). The release of $CO_x$ from the blowing agent expands the microsphere. Hence, by pre-calcinating the inorganic material in air, the relative amount of ferric oxide is increased, which is then used as a source of oxygen for blowing agents to produce more gas, thereby lowering the density of the microparticles. In addition, calcination can promote pre-reaction of oxide components and/or cause partial vitrification in the inorganic material, which may be beneficial in the production of high quality microparticles.

In cases where high chemical durability is required, the primary inorganic component is preferably a low alkali material. By "low alkali material", it is meant a material having an alkali metal oxide content of less than about 10 wt. %. In some embodiments, high alkali materials may still be included in the inorganic primary component. Accordingly, waste glass powders, such as soda lime glasses (sometimes referred to as cullet) having an alkali content of up to about 15 wt. % may be included.

Preferably, the inorganic primary component has an average primary particle size in the range of about 0.01 to 100 microns, more preferably about 0.05 to 50 microns, more preferably about 0.1 to 25 microns, and more preferably about 0.2 to 10 microns. Preferred particle sizes may be achieved by appropriate grinding and classification. All types of grinding, milling, and overall size reduction techniques that are used in ceramic industry can be used. Without limiting to other methods of size reduction used for brittle solids, preferred methods according to the present invention are ball milling (wet and dry), high energy centrifugal milling, jet milling, and attrition milling. If more than one inorganic material is to be used, then the multitude of ingredients can be co-ground together. In one embodiment, all the constituent materials of the agglomerate precursor are co-ground together, such as in a wet ball mill, before mixing.

Blowing Component

The blowing agents used in the preferred embodiments of the present invention are compounds which, when heated, liberate a blowing gas by one or more of combustion, evaporation, sublimation, thermal decomposition, gasification or diffusion. The blowing gas may be, for example, $CO_2$, CO, $O_2$, $N_2$, $N_2O$, NO, $NO_2$, $SO_2$, $SO_3$ $H_2O$ or mixtures thereof. Preferably, the blowing gas comprises $CO_2$ and/or CO.

Preferably, the amount of blowing component is in the range of about 0.05 to 10 wt. % based on the total dry weight of the precursor, more preferably about 0.1 to 6 wt. %, and more preferably about 0.2 to 4 wt. %. The exact amount of blowing component will depend on the composition of the inorganic primary component, the types of blowing agents and the required density of the final hollow microsphere.

In one embodiment, the blowing component comprises a primary blowing agent and a secondary blowing agent. The primary blowing agent has a first activation temperature and the second blowing agent has a second activation temperature lower than the first activation temperature. In other words, in use, the secondary blowing agent is initially activated as temperature rises followed by the primary blowing agent. This conserves the primary blowing agent.

Preferably, the primary blowing agent is selected from powdered coal, carbon black, activated carbon, graphite, carbonaceous polymeric organics, oils, carbohydrates such as sugar, corn syrup, starch; PVA, various amines, carbonates, carbides (e.g. silicon carbide, aluminium carbide), sulfates, sulfides, nitrides ( such as aluminium nitride, silicon nitride, boron nitride), nitrates, polyols, glycols, glycerine or combinations thereof. Silicon carbide and carbon black are particularly preferred primary blowing agents.

Preferably, the secondary blowing agent is selected from, carbon, carbonaceous polymeric organics, oils, carbohydrates such as sugar, corn syrup, starch; PVA, various amines, carbonates, sulfates, sulfides, nitrides, nitrates, polyols, glycols, glycerine or combinations thereof. Carbon black, sugar, corn syrup and starch are particularly preferred secondary blowing agents.

In alternative embodiments of the present invention, the blowing component comprises further blowing agents, in addition to the primary and secondary blowing agents described above. These additional blowing agents are designated tertiary, quaternary etc. blowing agents having corresponding third, fourth etc. activation temperatures.

Accordingly, in one alternative embodiment the blowing component further comprises a tertiary blowing agent having a third activation temperature, wherein the third activation temperature is less than the first activation temperature. Preferably, the third activation temperature is also less than the second activation temperature. The tertiary blowing agent may be selected from carbonaceous polymeric organics, oils, carbohydrates such as sugar, corn syrup, starch; PVA, various amines, sulfates, sulfides, nitrides, nitrates, polyols, glycols, glycerine or combinations thereof. Sugar, corn syrup, and starch are particularly preferred tertiary blowing agents. Preferably, and particularly if the blowing agent is non-water soluble, the blowing agent has an average particle size of about 10 microns.

The use of multiple blowing agents has been shown to have particular benefits in the synthesis of expanded microparticles. It provides control of the blowing (expansion) process, thereby allowing a reliable synthesis of expanded microparticles from a wide range of readily available and inexpensive inorganic materials. Furthermore, it maximises the efficiency of high quality (and relatively expensive) primary blowing agents, which further reduces the cost of synthetically manufacturing expanded microparticles.

Without wishing to be bound by theory, it is believed that the primary blowing agent produces the majority of gas during the blowing (expansion) process when the precursor. The secondary and, optionally, tertiary, quaternary etc. blowing agent acts as a sacrificial material by reducing or preventing premature spending of the primary blowing agent, for example by vaporisation and/or oxidation, before the precursor material has become molten enough to capture the blowing gas during the expansion process.

For instance, a preferred blowing agent composition includes silicon carbide as a primary blowing agent and carbon or powdered coal as a secondary blowing agent. Carbon acts as the sacrificial blowing agent and starts to oxidize first keeping oxygen away from carbide until the precursor melts. Once the precursor melts, the majority of CO and $CO_2$ gas produced by oxidation of carbide is trapped within the molten precursor.

Figure 2:
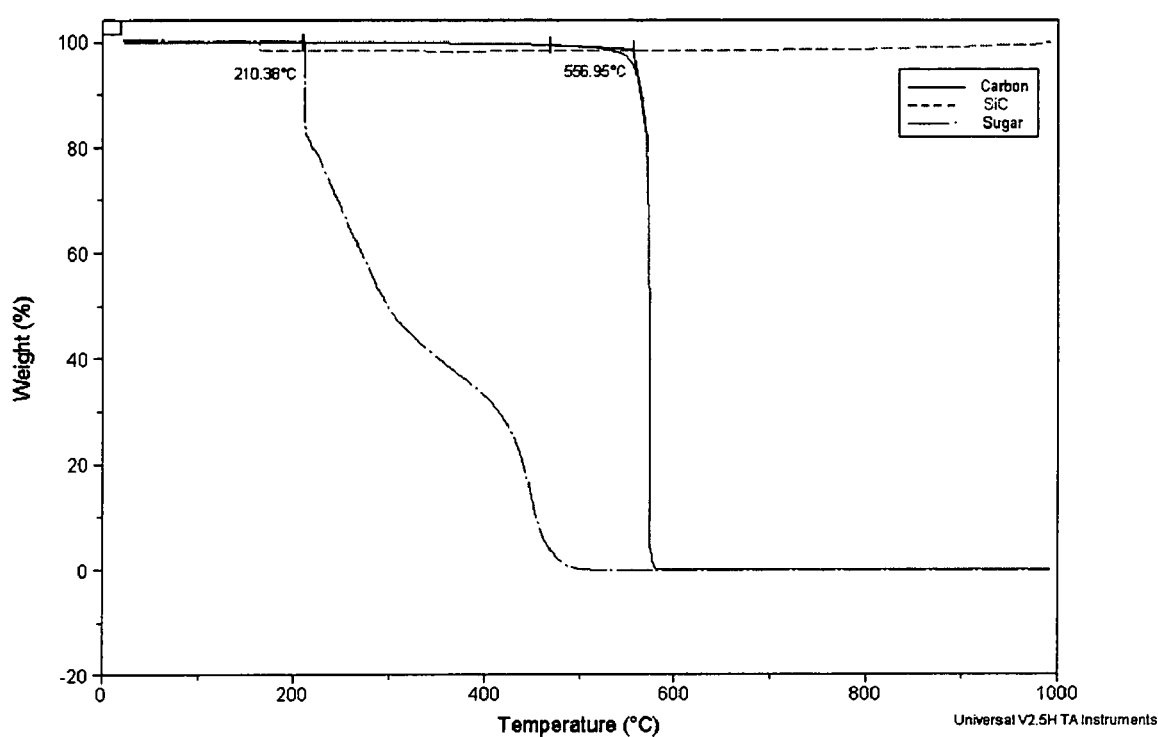
FIG. 2 is a TGA plot of three preferred blowing agents, sugar, carbon black and silicon carbide, showing sequential activation temperatures of sugar to be the lowest and carbide being the highest.

An alternative blowing agent composition comprises silicon carbide as the primary blowing agent, carbon as the secondary blowing agent, and sugar as the tertiary blowing agent. Without wishing to be bound by theory, it is believed that sugar starts to oxidize first preventing oxidation of carbon and carbide, then carbon begins to oxidize preventing oxidation of carbide, and then finally carbide oxidizes to CO and $CO_2$, which are primarily responsible for blowing (expansion) of the microparticle. One advantage of the preferred embodiments is to reduce the overall cost of the blowing agent. Sugar is less costly than carbon, and silicon carbide is by far much more expensive than either one. By using the multi blowing agents, the amount of expensive silicon carbide required to produce a given low density product is dramatically reduced. FIG. 2 depicts the TGA (thermal gravimetric analysis) of sugar, carbon, and silicon carbide in air. The activation temperatures with ascending order start with sugar, then carbon, and finally silicon carbide.

This novel mixture of blowing agents allows the use of inexpensive sacrificial blowing agents, such as sugar, carbon and/or powdered coal, in order to increase the efficiency and blowing capacity of a more expensive primary blowing agent, such as silicon carbide.

As discussed earlier, an additional and important advantage is realised when the precursors are prepared using the spray drying method. By making use of the mechanism described above, whereby relatively water-soluble species are pulled towards the exterior of the precursor during spray drying, an advantageous intra-particle distribution of primary and secondary blowing agents can be achieved.

Hence, using a relatively water-insoluble primary blowing agent and a relatively water-soluble secondary blowing agent, the secondary blowing agent can migrate towards the surface of the precursor, leaving the primary blowing agent uniformly dispersed. With the primary and secondary blowing agents separated in this way, the secondary blowing agent can more effectively "scavenge" oxygen away from the primary blowing agent in the critical period during firing in which a glassy skin has not yet formed around the precursor. This scavenging effect protects the primary blowing agents against premature spending, thereby maximising its blowing capacity after or during formation of the glassy skin.

Sugar is an example of a useful secondary blowing agent. Sugar is soluble in water and will migrate towards the exterior of the precursor during spray drying. At the same time, sugar can be converted to carbon at the spray drying temperature, resulting in a fine dispersion of carbon particles throughout the exterior part of the precursor. This fine dispersion of carbon particles acts as an effective secondary (sacrificial) blowing agent by scavenging oxygen away from a primary blowing agent such as silicon carbide during the initial period of firing. Furthermore, organic compounds, such as sugar and starch, help to bind the agglomerate precursor constituents together. Thus, materials such as sugar and starch can act as both binding agents and blowing agents in certain preferred embodiments of the present invention.

Control Agent

The secondary and tertiary blowing agents mentioned above act as control agents to protect and conserve the primary blowing agent in the precursor formulation. Persons skilled in the art will be aware of other materials which can be included in the precursor formulation and which can act to control activation of the blowing agent by, for example, scavenging oxygen in the process environment.

Binding Agent

In a preferred embodiment of the present invention, a binding agent/agents (or binder) may be mixed with the inorganic primary component and blowing component. The primary function of the binding agent is to intimately bind the silicate particles in the precursor together. The binder also may be selected to react with the silicate materials to lower the viscosity of the resulting glassy microparticles at the firing temperature.

In general, any chemical substance that is reactive and/or adheres with the inorganic primary component can be used as the binding agent. The binder may be any commercially available material used as a binder in the ceramic industry.

Preferably, the binding agent is selected from alkali metal silicates (e.g. sodium silicate), alkali metal aluminosilicates, alkali metal borates (e.g. sodium tetraborate), alkali or alkaline earth metal carbonates, alkali or alkaline earth metal nitrates, alkali or alkaline earth metal nitrites, boric acid, alkali or alkaline earth metal sulfates, alkali or alkaline earth metal phosphates, alkali or alkaline earth metal hydroxides (e.g. NaOH, KOH or $Ca(OH)_2$), carbohydrates (e.g. sugar, starch etc.), colloidal silica, inorganic silicate cements, Portland cement, lime-based cement, phosphate-based cement, organic polymers (e.g. polyacrylates) or combinations thereof. In some cases, fly ash, such as ultrafine, Type C or Type F fly ash, can also act as a binding agent. The binding agent and blowing agent are typically different from each other, although in some cases (e.g. sugar, starch etc.) the same substance may have dual blowing/binding agent properties, as described above.

The term "binder" or "binding agent", as used herein, includes all binding agents mentioned above, as well as the in situ reaction products of these binding agents with other components in the agglomerate. For example, an alkali metal hydroxide (e.g. NaOH) will react in situ with at least part of an inorganic primary component comprising a silicate to produce an alkali metal silicate. Sodium hydroxide may also form sodium carbonate when exposed to ambient air containing $CO_2$, the rate of this process increasing at higher temperatures (e.g. 400° C.). The resulting sodium carbonate can react with silicates to form sodium silicate. Preferably, the amount of binding agent is in the range of about 0.1 to 50 wt. % based on the total dry weight of the agglomerate precursor, more preferably about 0.5 to 40 wt. % and more preferably about 1 to 30 wt. %.

It has already been discussed above that it is preferred to have the binding agent towards the exterior of the precursor so that, during firing, the binding agent forms a molten skin. Formation of this molten skin should preferably be prior to or during activation of the blowing component, especially activation of the primary blowing agent. Not only will this formation of a molten skin further protect blowing agent within the precursor, it advantageously provides synthetic expanded microparticles of low density.

Using the spray drying method for forming the agglomerate precursor, it has been unexpectedly found that the concentration of the binding agent, as well as the blowing agents, within different zones of the agglomerate precursor can be controlled by appropriate selection of the solubility limits of this component. Accordingly, it is preferred that, using the spray drying method, the binding agent has a relatively high water-solubility so that it is more concentrated at the exterior of the agglomerate precursor and, hence, can form a molten skin during subsequent firing. Alkali compounds such as alkali hydroxides, or in particular compounds of sodium silicate and sodium aluminosilicate are preferred binding agents in this regard, since they are soluble in water and can, therefore, migrate towards the exterior of the agglomerate precursor.

Method of Forming Synthetic Expanded Microparticles

The precursors produced by the method described above may be used to synthesize expanded microparticles by firing at a predetermined temperature profile. Preferably, the temperature profile during firing fuses the precursor into a melt, reduces the viscosity of the melt, seals the surface of the precursor and promotes expansive formation of gas within the melt to form bubbles. The temperature profile should also preferably maintain the melt at a temperature and time sufficient to allow gas bubbles to coalesce and form a single primary void. After foaming, the newly expanded particles are rapidly cooled, thus forming hollow glassy microsparticles. Accordingly, the temperature profile is preferably provided by a furnace having one or more temperature zones, such as a drop tube furnace, a vortex type furnace, a fluidised bed furnace or a fuel-fired furnace, with upward or downward draft air streams. A fuel-fired furnace includes furnace types in which precursors are introduced directly into one or a multitude of combustion zones, to cause expansion or blowing of the particles. This is a preferred type of furnace, since the particles benefit by direct rapid heating to high temperatures, which is desirable. The heat source may be electric or provided by burning fossil fuels, such as natural gas or fuel oil. However, the preferred method of heating is by combustion of natural gas, since this is more economical than electric heating and cleaner than burning fuel oil.

Typically, the peak firing temperature in firing step is in the range of about 600 to 2500° C., more preferably about 800 to 2000° C., more preferably about 1000 to 1500° C., and more preferably about 1100 to 1400° C. However, it will be appreciated that the requisite temperature profile will depend on the type of inorganic primary component and blowing component used. Preferably, the exposure time to the peak firing temperature described above will be for a period of about 0.05 to 20 seconds, more preferably about 0.1 to 10 seconds.

Synthetic Hollow Microspheres

Certain preferred embodiments of the present invention further provide a synthetic hollow microsphere obtained by the method described above. Such hollow microparticle are inexpensive to produce and may be used advantageously as a cheap alternative to harvested cenospheres.

Synthetic hollow microparticle according to the preferred embodiments of the present invention typically comprise a substantially spherical wall with a closed shell (void) structure. The synthetic hollow microparticle preferably have one or more of the following characteristics, which are also generally characteristics of harvested cenospheres:

(i) an aspect ratio of between about 0.8 and 1.
(ii) a void volume of between about 30 and 95%, based on the total volume of the microsphere;
(iii) a wall thickness of between about 5 and 30% of the microsphere radius;
(iv) a composition of 30 to 85 wt. % $SiO_2$, 2 to 45 wt. % (preferably 6 to 40 wt. %) $Al_2O_3$, up to about 30 wt. % divalent metal oxides (e.g. MgO, CaO, SrO, BaO), 2 to 10 wt. % monovalent metal oxides (e.g. $Na_2O$, $K_2O$), and up to about 20 wt. % of other metal oxides, including metal oxides which exist in multiple oxidation states (e.g. $TiO_2$, $Fe_2O_3$ etc.);
(v) a silica to alumina ratio which is greater than about 1;
(vi) an average diameter of between about 30 and 1000 microns, more preferably between about 40 and 500 microns. (An average diameter of about 30 microns or above is advantageous, because such particles are not considered to be respirable dusts);
(vii) an outer wall thickness of between about 1 and 100 microns, preferably between about 1 and 70 microns, more preferably between about 2.5 and 20 microns;
(viii) a particle density of between about 0.1 and 2.0 g/cm$^3$, more preferably between about 0.2 and 1.5 g/cm$^3$, and more preferably between about 0.4 and 1.0 g/cm$^3$; or
(ix) a bulk density of less than about 1.4 g/cm$^3$, preferably less than about 1.0 g/cm$^3$.

Use of Synthetic Expanded Microparticles

The synthetic expanded microparticles according to certain preferred embodiments of the present invention may be used in a wide variety of applications, for example, in filler applications, modifier applications, containment applications or substrate applications. The scope of applications is much greater than that of harvested cenospheres due to the low cost and consistent properties of synthetic microspheres.

Synthetic microparticles according to the preferred embodiments may be used as fillers in composite materials, where they impart properties of cost reduction, weight reduction, improved processing, performance enhancement, improved machinability and/or improved workability. More specifically, the synthetic microparticles may be used as fillers in polymers (including thermoset, thermoplastic, and inorganic geopolymers), inorganic cementitious materials (including material comprising Portland cement, lime cement, alumina-based cements, plaster, phosphate-based cements, magnesia-based cements and other hydraulically settable binders), concrete systems (including precise concrete structures, tilt up concrete panels, columns, suspended concrete structures etc.), putties (e.g. for void filling and patching applications), wood composites (including particleboards, fibreboards, wood/polymer composites and other composite wood structures), clays, and ceramics. One particularly preferred use is in fibre cement building products.

The synthetic expanded microparticles may also be used as modifiers in combination with other materials. By appropriate selection of size and geometry, the microparticles may be combined with certain materials to provide unique characteristics, such as increased film thickness, improved distribution, improved flowability etc. Typical modifier applications include light reflecting applications (e.g. highway markers and signs), industrial explosives, blast energy absorbing structures (e.g. for absorbing the energy of bombs and explosives), paints and powder coating applications, grinding and blasting applications, earth drilling applications (e.g. cements for oil well drilling), adhesive formulations and acoustic or thermal insulating applications.

The synthetic expanded microparticles may also be used to contain and/or store other materials. Typical containment applications include medical and medicinal applications (e.g. microcontainers for drugs), micro-containment for radioactive or toxic materials, and micro-containment for gases and liquids.

The synthetic expanded microparticles may also be used in to provide specific surface activities in various applications where surface reactions are used such as substrate applications. Surface activities may be further improved by subjecting the microparticles to secondary treatments, such as metal or ceramic coating, acid leaching etc. Typical substrate applications include ion exchange applications for removing contaminants from a fluid, catalytic applications in which the surface of the microparticle is treated to serve as a catalyst in synthetic, conversion or decomposition reactions, filtration where contaminants are removed from gas or liquid streams, conductive fillers or RF shielding fillers for polymer composites, and medical imaging.

EXAMPLE 1

This example illustrates a method to make expanded microparticles from formulations consisting of basalt and sodium hydroxide.

The formulations were prepared by mixing ground basalt with solid sodium hydroxide and water. Various mixtures of blowing agents with control agents including silicon carbide, sugar, carbon black and coal were added either in combination or isolation. The formulations are shown in Table 1. The composition of the basalt is given in Table 2.

Formulation 1A

This formulation illustrates a method to make expanded microparticles from a formulation consisting of basalt, sodium hydroxide and sugar as the blowing agent. A sample was prepared by mixing about 92 grams of basalt; ground to a $d_{50}$ particle size of about 2 microns, with about 5 grams of solid sodium hydroxide (flakes), about 3 grams of commercial sugar and about 23 mL of water. The formulation is shown in Table 1.

Formulation 1B

This formulation illustrates a method to make expanded microparticles from a formulation consisting of basalt, sodium hydroxide and carbon black as the blowing agent. A sample was prepared by mixing 94 grams of basalt; ground to a $d_{50}$ particle size of about 2 microns, with about 5 grams of solid sodium hydroxide (flakes), about 1 gram of a commercial grade carbon black and about 38 mL of water. The formulation is shown in Table 1.

Formulation 1C

This formulation illustrates a method to make expanded microparticles from a formulation consisting of basalt, sodium hydroxide and silicon carbide as the blowing agent. A sample was prepared by mixing 94.5 grams of basalt; ground to a $d_{50}$ particle size of about 1 micron, with 5 grams of solid sodium hydroxide (flakes), 0.5 grams of a commercial grade silicon carbide and 38 mL of water. The formulation is shown in Table 1.

Formulation 1D

This formulation illustrates a method to make expanded microparticles from a formulation consisting of basalt, sodium hydroxide, silicon carbide as the primary blowing agent and coal as the control agent or secondary blowing agent. A sample was prepared by mixing about 93.5 grams of basalt, about 0.5 grams of a commercial grade silicon carbide and about 1 gram of a commercial grade coal; the resulting blend being co-ground to a $d_{50}$ particle size of about 1 micron. This blend was then mixed with about 5 grams of solid sodium hydroxide (flakes) and about 38 mL of water. The formulation is shown in Table 1.

Formulation 1E

This formulation illustrates a method to make expanded microparticles from a formulation consisting of basalt, sodium hydroxide, silicon carbide as the primary blowing agent and sugar as the control agent or secondary blowing agent. A sample was prepared by mixing about 92 grams of basalt; ground to a $d_{50}$ particle size of about 1 micron, with about 5 grams of solid sodium hydroxide (flakes), about 0.5 grams of a commercial grade silicon carbide, about 2.5 grams of a commercial sugar and about 37 mL of water. The formulation is shown in Table 1.

Formulation 1F

This formulation illustrates a method to make expanded microparticles from a formulation consisting of basalt, sodium hydroxide, carbon black as the primary blowing agent and sugar as the control agent or secondary blowing agent. A sample was prepared by mixing about 91.4 grams of basalt; ground to a $d_{50}$ particle size of about 2 microns, with about 4.8 grams of solid sodium hydroxide (flakes), about 0.8 grams of a commercial grade carbon black, about 3 grams of a commercial sugar and about 38 mL of water. The formulation is shown in Table 1.

Each mixture was blended into homogeneous slurry, poured into a flat dish and allowed to solidify at room temperature for approximately 5 minutes. The resulting product was further dried at about 50 degrees Celsius for about 20 hours, after which it was ground and sieved to obtain powders within a size range of about 106 to 180 microns. In the next step, the powders were fed into a vertical heated tube furnace at an approximate feed rate of about 0.14 g/min. The constant temperature zone of the furnace could be adjusted to provide residence times from less than one second to approximately several seconds at the peak firing temperatures. The foamed microparticles were collected on a funnel shaped collecting device covered with a fine mesh screen positioned at the bottom portion of the furnace. A mild suction was applied to the end of funnel to aid in collecting the microparticles. The products were characterized for particle density (e.g. apparent density), and microscopic examination by SEM. The results are summarized in Table 3. FIGS. 3 to 9 show SEM examinations of the products obtained from formulations 1A to 1F respectively.

TABLE 1

Formulations (grams) 1A to 1F

| Formulation No. | Basalt | Sodium Hydroxide | Blowing Agent | Control Agent | Water (mL) |
|---|---|---|---|---|---|
| 1A | 92.0 | 5.0 | 3.0 Sugar | — | 23 |
| 1B | 94.0 | 5.0 | 1.0 Carbon Black | — | 38 |
| 1C | 94.5 | 5.0 | 0.5 SiC | — | 38 |
| 1D | 93.5 | 5.0 | 0.5 SiC | 1.0 powdered coal | 38 |
| 1E | 92.0 | 5.0 | 0.5 SiC | 2.5 Sugar | 37 |
| 1F | 91.4 | 4.8 | 0.8 Carbon Black | 3.0 Sugar | 38 |

TABLE 2

Composition of Basalt

| $SiO_2$ | $Al_2O_3$ | $Fe_2O_3$ | CaO | MgO | $SO_3$ | $Na_2O$ | $K_2O$ | $TiO_2$ | $Mn_2O_3$ | $P_2O_5$ | Total |
|---|---|---|---|---|---|---|---|---|---|---|---|
| 46.1 | 15.8 | 11.4 | 9.5 | 9.6 | 0.0 | 2.8 | 1.5 | 2.4 | 0.25 | 0.59 | 99.94 |

TABLE 3

Result Summary

| Formulation No. | Temperature (degree C.) | Residence time (second) | Apparent density (g/cm³) |
|---|---|---|---|
| 1A | 1300 | 0.6-1.1 | 1.28 |
| 1B | 1300 | 0.6-1.1 | 1.13 |
| 1C | 1250 | 0.6-1.1 | 1.13 |
| 1D | 1300 | 0.6-1.1 | 0.82 |
| 1E | 1300 | 0.6-1.1 | 0.85 |
| 1F | 1300 | 0.6-1.1 | 1.21 |

Example 1 illustrates the following

SiC is a more effective primary blowing agent than carbon and sugar to lower the particle density. Note that the net carbon content of SiC (30 wt % carbon) is less than equivalent mass of carbon in carbon (100 wt %), and sugar (40 wt % carbon);

Use of SiC with one or more control agents is more effective in lowering the particle density compared to any single blowing agent used in this example; and The combination of any single blowing agent with a control agent can be optimized to strongly influence the product's particle density, such as all SiC combinations are more effective to lower the particle density as compared to carbon-sugar combination.

EXAMPLE 2

This example illustrates a method to make expanded microparticles from a formulation consisting of various silicate compounds, sodium hydroxide and multi-blowing agents. Expanded microparticles were prepared using blends of a soda lime waste glass and various silicate materials. These blends also include mixtures of a primary blowing agent with control agents of silicon carbide with control agents, sugar, and/or carbon black. The formulations are shown in Table 4. The composition of the waste glass used in this work is given in Table 5.

Formulation 2A

This formulation illustrates a method to make expanded microparticles from a formulation consisting of glass, sodium hydroxide, with silicon carbide as the blowing agent and carbon black as the control agent. A sample was prepared by mixing about 95.6 grams of glass; ground to a $d_{50}$ particle size of about 1 micron, with about 3 grams of solid sodium hydroxide (flakes), about 0.4 grams of a commercial grade silicon carbide, about 1 gram of a commercial grade carbon black and about 58 mL of water. The formulation is shown in Table 4.

Formulation 2B

This formulation illustrates a method to make expanded microparticles from a formulation consisting of glass, fly ash, sodium hydroxide, with silicon carbide as the blowing agent and carbon black as the control agent. A sample was prepared by mixing about 65.5 grams of glass and about 28.1 grams of fly ash; the mixture being co-ground to a $d_{50}$ particle size of about 2 microns. The glass/fly ash blend was mixed with about 5 grams of solid sodium hydroxide (flakes), about 0.4 grams of a commercial grade silicon carbide, about 1 gram of a commercial grade carbon black and about 42 mL of water. The formulation is shown in Table 4. The composition of the fly ash is given in Table 5.

Formulation 2C

This formulation illustrates a method to make expanded microparticles from a formulation consisting of glass, basalt, sodium hydroxide, with silicon carbide as the blowing agent and carbon black as the control agent. A sample was prepared by mixing about 46.8 grams of glass and about 46.8 grams of basalt; the mixture being co-ground to a $d_{50}$ particle size of about 2 microns. The glass/basalt blend was mixed with about 5 grams of solid sodium hydroxide (flakes), about 0.4 grams of a commercial grade silicon carbide, about 1 gram of a commercial grade carbon black and about 37 mL of water. The formulation is shown in Table 4. The composition of the basalt is given in Table 5.

Formulation 2D

This formulation illustrates a method to make expanded microparticles from a formulation consisting of glass, volcanic ash, sodium hydroxide, with silicon carbide as the blowing agent and carbon black as the control agent. A sample was prepared by mixing about 46.8 grams of glass and about 46.8 grams of volcanic ash; the mixture being co-ground to a $d_{50}$ particle size of about 2 microns. The glass/volcanic ash blend was mixed with about 5 grams of solid sodium hydroxide (flakes), about 0.4 grams of a commercial grade silicon carbide, about 1 gram of a commercial grade carbon black and about 50 mL of water. The formulation is shown in Table 4. The composition of the volcanic ash is given in Table 5.

Formulation 2E

This formulation illustrates a method to make expanded microparticles from a formulation consisting of glass, andesite, sodium hydroxide, with silicon carbide as the primary blowing agent and sugar as the control agent. A sample was prepared by mixing about 47.1 grams of glass and about 47.1 grams of andesite; the mixture being co-ground to a $d_{50}$ particle size of about 2 microns. The glass/andesite blend was mixed with about 3 grams of solid sodium hydroxide (flakes), about 0.4 grams of a commercial grade silicon carbide, about 2.5 grams of sugar and about 50 mL of water. The formulation is shown in Table 4. The composition of the andesite is given in Table 5.

Formulation 2F

This formulation illustrates a method to make expanded microparticles from a formulation consisting of glass, andesite, sodium hydroxide, with silicon carbide as the blowing agent and carbon black as the control agent. A sample was prepared by mixing about 47.8 grams of glass and about 47.8 grams of andesite; the mixture being co-ground to a $d_{50}$ particle size of about 1 micron. The glass/andesite blend was mixed with about 3 grams of solid sodium hydroxide (flakes), about 0.4 grams of a commercial grade silicon carbide, about 1 gram of a commercial grade carbon black and about 43 mL of water. The formulation is shown in Table 4.

Each mixture was blended into homogeneous slurry, poured into a flat dish and allowed to solidify at room temperature for approximately 5 minutes. The resulting product was further dried at about 50 degrees Celsius for about 20 hours, after which it was ground and sieved to obtain powders within a size range of about 106 to 180 microns. In the next step, the powders were fed into a vertical heated tube furnace at an approximate feed rate of about 0.14 g/min. The constant temperature zone of the furnace could be adjusted to provide residence times from less than one second to approximately several seconds at the peak firing temperatures. The foamed microparticles were collected on a funnel shaped collecting device covered with a fine mesh screen positioned at the bottom portion of the furnace. A mild suction was applied to the end of funnel to aid in collecting the microparticles. The products were characterized for particle density (e.g. apparent density), and microscopic examination by SEM. The results are summarized in Table 6.

FIGS. 10 to 16 show SEM cross sectional views for each of 5 samples made with Formulations 2A to 2F.

TABLE 4

Formulations (grams) 2A to 2F

| Formulation No. | Waste Glass | Additional Component | Sodium Hydroxide | Blowing Agent | Control Agent | Water (mL) |
|---|---|---|---|---|---|---|
| 2A | 95.6 | — | 3.0 | 0.4 SiC | 1.0 Carbon Black | 58 |
| 2B | 65.5 | 28.1 fly ash | 5.0 | 0.4 SiC | 1.0 Carbon Black | 42 |
| 2C | 46.8 | 46.8 basalt | 5.0 | 0.4 SiC | 1.0 Carbon Black | 37 |
| 2D | 46.8 | 46.8 volcanic ash | 5.0 | 0.4 SiC | 1.0 Carbon Black | 50 |
| 2E | 47.1 | 47.1 andesite | 3.0 | 0.4 SiC | 2.5 Sugar | 42 |
| 2F | 47.8 | 47.8 andesite | 3.0 | 0.4 SiC | 1.0 Carbon Black | 43 |

TABLE 5

Chemical Compositions

| | $SiO_2$ | $Al_2O_3$ | $Fe_2O_3$ | CaO | MgO | $SO_3$ | $Na_2O$ | $K_2O$ | $TiO_2$ | $Mn_2O_3$ | $P_2O_5$ | Total |
|---|---|---|---|---|---|---|---|---|---|---|---|---|
| Glass | 74.7 | 2.0 | 0.9 | 11.1 | 0.6 | 0.0 | 10.0 | 0.5 | 0.06 | 0.06 | 0.02 | 99.94 |
| Fly Ash | 52.7 | 20.2 | 13.2 | 7.6 | 2.5 | 0.4 | 0.4 | 1.3 | 1.3 | 0.16 | 0.08 | 99.84 |
| Volcanic Ash | 76.4 | 12.4 | 2.1 | 0.9 | 0.3 | 0.0 | 2.1 | 5.5 | 0.15 | 0.08 | 0.03 | 99.96 |
| Andesite | 67.8 | 15.2 | 4.6 | 2.1 | 0.6 | 0.0 | 2.7 | 4.9 | 0.7 | 0.9 | 0.28 | 99.78 |

TABLE 6

Result Summary

| Formulation No. | Temperature (degree C.) | Residence time (second) | Apparent density (g/cm$^3$) |
|---|---|---|---|
| 2A | 1200 | 0.6-1.1 | 0.98 |
| 2B | 1300 | 0.6-1.1 | 1.11 |
| 2C | 1200 | 0.6-1.1 | 0.93 |
| 2D | 1200 | 0.6-1.1 | 0.94 |
| 2E | 1300 | 0.6-1.1 | 0.93 |
| 2F | 1300 | 0.6-1.1 | 0.77 |

The following conclusions can be drawn from Example 2.

The combination of blowing agent with control agent such as silicon carbide-carbon and silicon carbide-sugar is very effective in production of expanded microparticles;

Waste glass is an economical and suitable addition to various silicate mixtures; and Silicate raw materials, appropriate for production of expanded microparticles according to certain embodiments of present invention can be selected from a wide range of waste byproducts, minerals, chemicals, and rocks.

EXAMPLE 3

This example illustrates a method to make expanded microparticles from formulations comprising various quantities of volcanic ash, sodium hydroxide, mixtures of blowing and control agents and other minor additives.

Formulation 3A

A sample was prepared by mixing about 78.2 grams of volcanic ash; ground to a $d_{50}$ particle size of about 3 microns, with about 20 grams of solid sodium hydroxide (flakes), about 0.8 grams of a commercial grade silicon carbide as the primary blowing agent, about 1 gram of a commercial grade carbon black as the control agent and about 43 mL of water.

Formulations 3B and 3C

Samples were prepared using a blend of volcanic ash and iron (IE) oxide that was co-ground to a $d_{50}$ particle size of approximately 1 micron. The formulations are shown in Table 7. The composition of the volcanic ash is given in Table 5. The mixture was blended into homogeneous slurry, poured into a flat dish and allowed to solidify at room temperature for approximately 5 minutes. The resulting product was further dried at about 50 degrees Celsius for about 20 hours, after which it was ground and sieved to obtain powders within a size range of about 106 to 180 microns. In the next step, the powders were fed into a vertical heated tube furnace at an approximate, feed rate of about 0.14 g/min. The constant temperature zone of the furnace could be adjusted to provide residence times from less than one second to approximately several seconds at the peak firing temperatures. The foamed microparticles were collected on a funnel shaped collecting device covered with a fine mesh screen positioned at the bottom portion of the furnace. A mild suction was applied to the end of funnel to aid in collecting the microparticles. The products were characterized for particle density (e.g. apparent density), and microscopic examination by SEM.

The results are summarized in Table 8.

FIGS. 17 to 20 show two cross sections per sample, of the products of Formulations 3A to 3C respectively.

TABLE 7

Formulations (grams) 3A to 3C

| Formulation No. | Volcanic Ash | Sodium Hydroxide | Blowing Agents | Control Agents | Iron (III) Oxide | Water (mL) |
|---|---|---|---|---|---|---|
| 3A | 78.2 | 20.0 | 0.8 SiC | 1.0 Carbon Black | | 43 |
| 3B | 76.6 | 19.6 | 0.8 | 1.0 Carbon Black | 2.0 | 43 |
| 3C | 86.2 | 9.8 | 0.8 | 1.0 Carbon Black | 2.2 | 43 |

TABLE 8

Result Summary

| Formulation No. | Temperature (degree C.) | Residence time (second) | Apparent density (g/cm$^3$) |
|---|---|---|---|
| 3A | 1200 | 0.6-1.1 | 0.71 |
| 3B | 1200 | 0.6-1.1 | 0.60 |
| 3C | 1200 | 0.6-1.1 | 0.59 |

Example 3 illustrates the following:

Combination of silicon carbide as primary blowing agent and carbon black as control agent is very effective in expanding volcanic ash into very light rounded product; and As sodium concentration is increased in the formulation, the product roundness approaches near spherical shape. Sodium oxide is a powerful fluxing agent for silicate glasses, such as viscosity reducer. Therefore, less viscous formulations tend to form spherical expanded particles rather than only rounded micro-particles, primarily because of lower surface tension at the firing temperature.

EXAMPLE 4

This example illustrates a method to make expanded microparticles from formulations consisting of fly ash, sodium hydroxide, and blowing control agents.

Formulation 4A

A sample was prepared by mixing about 79 grams of a type F fly ash; ground to a $d_{50}$ particle size of about 4 microns, with about 19 grams of solid sodium hydroxide (flakes), about 1 gram of a commercial grade silicon carbide as the primary blowing agent, about 1 gram of a commercial grade carbon black as the control agent and about 42 mL of water.

Formulation 4B

A sample was made by mixing about 68.7 grams of a type F fly ash similar to the one used in formulation 4A, with about 29.5 grams of solid sodium hydroxide, as shown in Table 9. The composition of the fly ash is given in Table 5. The mixture was blended into homogeneous slurry, poured into a flat dish and allowed to solidify at room temperature for approximately 5 minutes. The resulting product was further dried at about 50 degrees Celsius for about 20 hours, after which it was ground and sieved to obtain powders within a size range of about 106 to 180 microns. In the next step, the powders were fed into a vertical heated tube furnace at an approximate feed rate of about 0.14 g/min. The constant temperature zone of the furnace could be adjusted to provide residence times from less than one second to approximately several seconds at the peak firing temperatures. The foamed microparticles were collected on a funnel shaped collecting device covered with a fine mesh screen positioned at the bottom portion of the furnace. A mild suction was applied to the end of funnel to aid in collecting the microparticles. The products were characterized for particle density (e.g. apparent density), and microscopic examination by SEM.

The results are summarized in Table 10. FIGS. 21 and 22 show two cross sections per sample, of the products of Formulations 4A and 4B respectively.

TABLE 9

Formulations (grams) 4A and 4B

| Formulation No. | Fly ash | Sodium Hydroxide | Blowing Agent | Control Agent | Water (mL) |
|---|---|---|---|---|---|
| 4A | 79.0 | 19.0 | 1.0 SiC | 1.0 Carbon Black | 42.0 |
| 4B | 68.7 | 29.5 | 0.8 SiC | 1.0 Carbon Black | 43.0 |

TABLE 10

Result Summary

| Formulation No. | Temperature (degree C.) | Residence time (second) | Apparent density (g/cm$^3$) |
|---|---|---|---|
| 4A | 1200 | 0.6-1.1 | 0.67 |
| 4B | 1200 | 0.6-1.1 | 1.03 |

Example 4 illustrates the following:

A combination of silicon carbide as the primary blowing agent and carbon as the control agent is very effective in producing low density microparticles from a silicate waste byproduct, fly ash;

The concentration of fluxing compound such as sodium hydroxide can be optimized to produce excellent spherical microparticles with low particle density; and Higher concentration of fluxing agent beyond an optimum value, not only increases the particle density of the product, but also negatively impacts the economy. Waste fly ash is much less expensive than sodium hydroxide.

EXAMPLE 5

This example illustrates a method to make expanded microparticles from a formulation consisting of phosphatic clay a waste byproduct from phosphate ore beneficiation, sodium hydroxide, silicon carbide and carbon black.

Formulation 5A

A sample was prepared by mixing about 88.4 grams of phosphatic clay; ground to a $d_{50}$ particle size of about 0.6 microns, with about 9.8 grams of solid sodium hydroxide (flakes), about 0.8 grams of a commercial grade silicon carbide, about 1.0 grams of a commercial grade carbon black and about 85 mL of water. The composition of the phosphatic clay is given in Table 11. The mixture was blended into homogeneous slurry, poured into a flat dish and allowed to solidify at room temperature for approximately 5 minutes. The resulting product was further dried at about 50 degrees Celsius for about 20 hours, after which it was ground and sieved to obtain powders within a size range of about 106 to 180 microns. In the next step, the powders were fed into a vertical heated tube furnace at an approximate feed rate of about 0.14 g/min. The constant temperature zone of the furnace could be adjusted to provide residence times from less than one second to approximately several seconds at the peak firing temperatures. The foamed microparticles were collected on a funnel shaped collecting device covered with a fine mesh screen positioned at the bottom portion of the furnace. A mild suction was applied to the end of funnel to aid in collecting the microparticles. The products were characterized for particle density such as apparent density, and microscopic examination by SEM.

The results are summarized in Table 12. FIGS. 35 and 36 show the cross section of the product.

TABLE 11

Chemical Composition of Phosphatic Clay

| $SiO_2$ | $Al_2O_3$ | $Fe_2O_3$ | CaO | MgO | $SO_3$ | $Na_2O$ | $K_2O$ | $TiO_2$ | $Mn_2O_3$ | $P_2O_5$ | Total |
|---|---|---|---|---|---|---|---|---|---|---|---|
| 36.5 | 17.8 | 2.7 | 20.8 | 3.4 | 0.33 | 0.29 | 0.88 | 0.57 | 0.05 | 16.7 | 100.0 |

TABLE 12

Result Summary

| Temperature (degree C.) | Residence time (second) | Apparent density (g/cm³) |
|---|---|---|
| 1300 | 0.8-1.5 | 0.92 |

Example 5 illustrates the following:

Multi-blowing agent combination of silicon carbide and carbon has been effectively used to produce low density microparticles from a waste clay byproduct; and The P2O5-CaO combined concentration is more than about 33% of the total wt % of the product. The combination can potentially form an amorphous apatite phase product. Apatite containing product may exhibit useful bioactive reactions in medical applications.

It will be understood that the present invention may be embodied in other forms without departing from the spirit or scope of the inventive idea.

What is claimed is:

1. A method of producing a low density material comprising providing a precursor by forming an aqueous mixture of inorganic primary component and more than one blowing agent, wherein each blowing agent is selected to and operates at a different temperature range, wherein the precursor has an alkali metal oxide content of less than 10 wt. % based on the total dry weight of the precursor;

drying the mixture and firing the precursor to activate each blowing agent to expand the precursor and form a low density material wherein activation of each blowing agent is controlled and this activation controls expansion of the precursor such that each blowing agent is activated within its own predetermined optimal temperature range.

2. The method of claim 1 wherein the low density material is a microparticle with a diameter of up to about 1,000 microns.

3. The method of claim 1 wherein the more than one blowing agent is activated within a temperature range in which the inorganic primary component has melted and is within an optimal viscosity range.

4. The method of claim 1 wherein the more than one blowing agent is controlled by a control agent.

5. The method of claim 1 wherein the more than one blowing agent is provided as a primary blowing agent and a control agent, and the control agent is provided as a secondary blowing agent.

6. The method of claim 1 wherein the more than one blowing agent includes a primary blowing agent having a first activation temperature and a secondary blowing agent having a second activation temperature which is less than the first activation temperature.

7. The method of claim 1, wherein the more than one includes a primary blowing agent is selected from the group consisting of powdered coal, carbon black, activated carbon, graphite, carbonaceous polymeric organics, oils, carbohydrates, PVA, carbonates, carbides, sulfates, sulfides, nitrides, nitrates, amines, polyols, glycols, glycerine, and combinations thereof.

8. The method of claim 1, wherein the more than one blowing agent includes a secondary blowing agent selected from the group consisting of powdered coal, carbon black, activated carbon, graphite, carbonaceous polymeric organics, oils, carbohydrates, PVA, carbonates, carbides, sulfates, sulfides, nitrides, nitrates, amines, polyols, glycols, glycerine, and combinations thereof.

9. The method of claim 1, wherein the precursor further comprises a tertiary blowing agent having a third activation temperature, wherein the third activation temperature is less than the first activation temperature.

10. The method of claim 1, wherein the more than one blowing agent includes a tertiary blowing agent is selected from the group consisting of powdered coal, carbon black, activated carbon, graphite, carbonaceous polymeric organics, oils, carbohydrates, PVA, carbonates, sulfates, sulfides, nitrates, amines, polyols, glycols, glycerine, and combinations thereof.

11. The method of claim 1, wherein firing of the precursor is conducted under such conditions as to control activation of the blowing agent.

12. The method of claim 1 wherein firing of the precursor is conducted in an oxygen deficient environment.

13. The method of claim 12 wherein firing of the precursor is conducted in a fuel rich and less oxidising environment.

14. The method of claim 1, wherein activation of the more than one blowing agent is controlled by appropriate dosing with $O_2$ depleting or $O_2$ enriching gases during firing of the precursor.

15. The method of claim 1 wherein the precursor is formed with a predetermined distribution of blowing agent there through, said distribution providing a controlled activation of the blowing agent during firing of the precursor.

16. The method of claim 1, wherein the drying step is performed using a spray dryer having an aqueous slurry feed.

17. The method of claim 16, wherein the spray dryer has an inlet temperature in the range of about 300 to 600° C.

18. The method of claim 16, wherein the spray dryer has an outlet temperature in the range of about 90 to 220° C.

19. The method of claim 1, wherein the amount of inorganic primary component is at least about 50 wt. %, based on the total dry weight of the precursor.

20. The method of claim 1, wherein the amount of blowing agent is in the range of about 0.05 to 10 wt. %, based on the total dry weight of the precursor.

21. The method of claim 1 wherein the ratio of inorganic primary component to blowing agent is in the range of about 1000:1 to 10:1.

22. The method of claim 1, wherein the mixture is dried such that the water content of the precursor is less than about 14 wt. %.

23. The method of claim 1, wherein the resultant precursors have an average agglomerate particle size in the range of about 10 to 1000 microns.

24. The method of claim 1, wherein the inorganic primary component comprises at least one material selected from the group consisting of inorganic oxides, non-oxides, salts, and combinations thereof.

25. The method of claim 1, wherein the inorganic primary component comprises at least one material selected from the group consisting of industrial by-products, residential by-products, minerals, rocks, clays, technical grade chemicals, and combinations thereof.

26. The method of claim 1, wherein the inorganic primary component comprises at least one silicate material.

27. The method of claim 26, wherein the at least one silicate material is selected from the group consisting of fly ash, bottom ash, blast-furnace slag, paper ash, basaltic rock, andesitic rock, feldspars, aluminosilicate clays, bauxite, volcanic ash, volcanic rocks, volcanic glasses, geopolymers, and combinations thereof.

28. The method of claim 1, wherein the inorganic primary component is capable of forming a viscoelastic liquid.

29. The method of claim 1, wherein the inorganic primary component has an average primary particle size in the range of about 0.01 to 100 microns.

30. The method of claim 5, wherein the primary blowing agent is relatively less water-soluble than the secondary blowing agent.

31. The method of claim 1, wherein the blowing agent has an average particle size in the range of 0.01 to 10 microns.

32. The method of claim 1, further comprising mixing a binding agent with the inorganic primary component and the blowing agent.

33. The method of claim 32, wherein the binding agent is selected from the group consisting of alkali metal silicates, alkali metal aluminosilicates, alkali metal borates, alkali or alkaline earth metal carbonates, alkali or alkaline earth metal nitrates, alkali or alkaline earth metal nitrites, boric acid, alkali or alkaline earth metal sulfates, alkali or alkaline earth metal phosphates, alkali or alkaline earth metal hydroxides, carbohydrates, colloidal silica, ultrafine fly ash, Type C fly ash, Type F fly ash, inorganic silicate cements, Portland cement, alumina cement, lime-based cement, phosphate-based cement, organic polymers, and combinations thereof.

34. The method of claim 32, wherein the binding agent has a melting point which is lower than the melting point of the resultant precursor as a whole.

35. The method of claim 32, wherein the binding agent has a melting point in the range of about 700 to 1000° C.

36. The method of claim 32, wherein the binding agent is a silicate.

37. The method of claim 32, wherein the binding agent is an alkali metal silicate generated by in situ reaction of an alkali metal hydroxide and an silicate primary component.

38. The method of claim 32, wherein the amount of binding agent is in the range of about 0.1 to 50 wt. %, based on the total dry weight of the precursor.

39. The method of claim 32, wherein the binding agent is relatively more water-soluble than the primary blowing agent.

40. The method of claim 1, wherein the primary component and the blowing agent are co-ground together.

41. A method of forming a precursor for a low density material comprising the steps of:
providing an inorganic primary component;
forming an aqueous mixture comprising the inorganic primary component, a blowing agent and a control agent; and
drying the mixture to provide an expandable precursor for forming a low density material, wherein said blowing agent and control agent are selected to control activation of the blowing agent such that the blowing agent is activated within a predetermined optimal and different temperature range than the control agent, wherein the precursor prior to expansion has an alkali metal oxide content of less than 10 wt. % based on the total dry weight of the precursor.

42. The method of claim 41, wherein the blowing agent is provided as a primary blowing agent, and the control agent is provided as a secondary blowing agent.

43. The method of claim 42, wherein the primary blowing agent has a first activation temperature and the secondary blowing agent has a second activation temperature which is less than the first activation temperature.

44. The method claim 42, wherein the primary blowing agent is selected from the group consisting of powdered coal, carbon black, activated carbon, graphite, carbonaceous polymeric organics, oils, carbohydrates, PVA, carbonates, carbides, sulfates, sulfides, nitrides, nitrates, amines, polyols, glycols, glycerine, and combinations thereof.

45. The method of claim 44, wherein the secondary blowing agent is selected from the group consisting of powdered coal, carbon black, activated carbon, graphite, carbonaceous polymeric organics, oils, carbohydrates, PVA, carbonates, carbides, sulfates, sulfides, nitrides, nitrates, amines, polyols, glycols, glycerine, and combinations thereof.

46. The method of claim 41, wherein the precursor further comprises a tertiary blowing agent having a third activation temperature, wherein the third activation temperature is less than the first activation temperature.

47. The method of claim 46, wherein the tertiary blowing agent is selected from the group consisting of powdered coal, carbon black, activated carbon, graphite, carbonaceous polymeric organics, oils, carbohydrates, PVA, carbonates, sulfates, sulfides, nitrates, amines, polyols, glycols, glycerine and combinations thereof.

48. The method of claim 41, wherein activation of the blowing agent is controlled by appropriate dosing with $O_2$ depleting or $O_2$ enriching gases during firing of the precursor.

49. The method of claim 41, wherein the precursor is formed with a predetermined distribution of blowing agent there through, said distribution providing a controlled activation of the blowing agent during firing of the precursor.

50. The method of claim 41, wherein the drying step is performed using a spray dryer having an aqueous slurry feed.

51. The method of claim 50, wherein the spray dryer has an inlet temperature in the range of about 300 to 600° C.

52. The method of claim 50, wherein the spray dryer has an outlet temperature in the range of about 90 to 220° C.

53. The method of claim 41, wherein the amount of inorganic primary component is at least about 50 wt. %, based on the total dry weight of the agglomerate precursor.

54. The method of claim 41, wherein the amount of blowing component is in the range of about 0.05 to 10 wt. %, based on the total dry weight of the agglomerate precursor.

55. The method of claim 41, wherein the ratio of inorganic primary component to blowing component is in the range of about 1000:1 to 10:1.

56. The method of claim 41, wherein the mixture is dried such that the water content of the precursor is less than about 14 wt. %.

57. The method of claim 41, wherein the resultant agglomerate precursors have an average agglomerate particle size in the range of about 10 to 1000 microns.

58. The method of claim 41, wherein the inorganic primary component comprises at least one material selected from the group consisting of inorganic oxides, non-oxides, salts and combinations thereof.

59. The method of claim 41, wherein the inorganic primary component comprises at least one material selected from the group consisting of industrial by-products, residential by-products, minerals, rocks, clays, technical grade chemicals and combinations thereof.

60. The method of claim 41, wherein the inorganic primary component comprises at least one silicate material.

61. The method of claim 60, wherein the at least one silicate material is selected from the group consisting of fly ash, bottom ash, blast-furnace slag, paper ash, basaltic rock, andesitic rock, feldspars, aluminosilicate clays, bauxite, volcanic ash, volcanic rocks, volcanic glasses, geopolymers, and combinations thereof.

62. The method of claim 41, wherein the inorganic primary component is capable of forming a viscoelastic liquid.

63. The method of claim 41, wherein the inorganic primary component has an average primary particle size in the range of about 0.01 to 100 microns.

64. The method of claim 42, wherein the primary blowing agent is relatively less water-soluble than the secondary blowing agent.

65. The method of claim 41, wherein the blowing agent has an average particle size in the range of about 0.01 to 10 microns.

66. The method of claim 41, further comprising mixing a binding agent with the inorganic primary component and the blowing agent.

67. The method of claim 66, wherein the binding agent is selected from the group consisting of alkali metal silicates, alkali metal aluminosilicates, alkali metal borates, alkali or alkaline earth metal carbonates, alkali or alkaline earth metal nitrates, alkali or alkaline earth metal nitrites, boric acid, alkali or alkaline earth metal sulfates, alkali or alkaline earth metal phosphates, alkali or alkaline earth metal hydroxides, carbohydrates, colloidal silica, ultrafine fly ash, Type C fly ash, Type F fly ash, inorganic silicate cements, Portland cement, alumina cement, lime-based cement, phosphate-based cement, organic polymers and combinations thereof.

68. The method of claim 66, wherein the binding agent has a melting point which is lower than the melting point of the resultant agglomerate precursor as a whole.

69. The method of claim 66, wherein the binding agent has a melting point in the range of about 700 to 1000° C.

70. The method of claim 66, wherein the binding agent is a silicate.

71. The method of claim 66, wherein the binding agent comprises an alkali metal silicate generated by in situ reaction of an alkali metal hydroxide and an silicate primary component.

72. The method of claim 66, wherein the amount of binding agent is in the range of about 0.1 to 50 wt. %, based on the total dry weight of the agglomerate precursor.

73. The method of claim 66, wherein the binding agent is relatively more water-soluble than the primary blowing agent.

74. The method of claim 41, wherein the primary component and the blowing agent are co-ground together.

75. A method of forming a precursor for a low density material comprising the steps of:
providing an inorganic primary component;
forming an aqueous mixture of the inorganic primary component and more than one blowing agent; and
drying the mixture to provide an expandable precursor for forming a low density material, wherein the precursor prior to expansion has an alkali metal oxide content of less than 10 wt. % based on the total dry weight of the precursor, wherein each blowing agent is selected and distributed in the precursor to control activation of the blowing agent upon firing of the precursor such that each blowing agent is activated within a predetermined optimal and different temperature range.

76. A method of controlling activation of the blowing agent in an inorganic mixture to produce expanded micro particles, said method comprising:
providing more than one blowing agent each of which is activated under predetermined and different conditions to release a blowing gas and produce expanded micro particles, wherein the expanded micro particles before expansion have an alkali metal oxide content of less than 10 wt. % based on the total dry weight of the precursor; and
controlling such conditions whereby said activation takes place within a predetermined optimal viscosity range of the inorganic mixture.

77. A method of producing a low density material comprising
providing a precursor by forming an aqueous mixture of inorganic primary component and more than one blowing agents, wherein the precursor has an alkali metal oxide content of less than 10 wt. % based on the total dry weight of the precursor, wherein the blowing agents are selected to be activated within predetermined and different optimal temperature ranges;

drying the mixture; and firing the precursor to activate each blowing agents for controlled expansion of the precursor, thereby forming a low density material.

* * * * *